United States Patent [19]

Bennett et al.

[11] Patent Number: 5,940,800
[45] Date of Patent: Aug. 17, 1999

[54] ATTORNEY TERMINAL HAVING OUTLINE PREPARATION CAPABILITIES FOR MANAGING TRIAL PROCEEDINGS

[75] Inventors: James D. Bennett, Chicago; Lawrence M. Jarvis, Wheaton, both of Ill.

[73] Assignee: Engate Incorporated, Wheaton, Ill.

[21] Appl. No.: 09/144,576

[22] Filed: Aug. 31, 1998

Related U.S. Application Data

[63] Continuation of application No. 08/518,102, Aug. 22, 1995, Pat. No. 5,815,392, which is a continuation of application No. 08/326,742, Oct. 20, 1994, Pat. No. 5,444,615, which is a continuation of application No. 08/073,809, Jun. 7, 1993, abandoned, which is a continuation-in-part of application No. 08/036,488, Mar. 24, 1993, Pat. No. 5,369,704.

[51] Int. Cl.⁶ ........................................................ G06F 19/00
[52] U.S. Cl. ........................................ 705/1; 705/8; 380/9
[58] Field of Search ............................... 705/1, 8; 380/9; 364/400

[56] References Cited

U.S. PATENT DOCUMENTS

| | | | |
|---|---|---|---|
| Re. 33,337 | 9/1990 | Lefler et al. | 178/21 |
| 4,633,430 | 12/1986 | Cooper | 707/500 |
| 4,692,042 | 9/1987 | Cuff et al. | 400/91 |
| 4,864,501 | 9/1989 | Kucera et al. | 704/8 |
| 4,924,387 | 5/1990 | Jeppesen | 705/8 |
| 4,965,763 | 10/1990 | Zamora | 704/1 |
| 5,031,113 | 7/1991 | Hollerbauer | 704/235 |
| 5,043,891 | 8/1991 | Goldstein et al. | 707/531 |
| 5,101,402 | 3/1992 | Chiu et al. | 395/200.54 |
| 5,127,003 | 6/1992 | Doll, Jr. et al. | 370/259 |
| 5,267,155 | 11/1993 | Buchanan et al. | 707/540 |
| 5,280,430 | 1/1994 | Woods et al. | 707/531 |
| 5,309,359 | 5/1994 | Katz et al. | 707/102 |
| 5,369,704 | 11/1994 | Bennett et al. | 380/9 |
| 5,369,763 | 11/1994 | Biles | 380/9 |
| 5,444,615 | 8/1995 | Bennett et al. | 705/8 |
| 5,463,547 | 10/1995 | Markowitz et al. | 707/507 |

OTHER PUBLICATIONS

"Reading with electronic eyes", *Computerworld*, Oct. 1, 1990, p. 41.
"Court speeds justice by putting records and court papers on–line", *PC Week*, Mar. 29, 1988, v. 5, n. 13 p. 27(1).
"Legal Tech '88 visitors view automated support systems", *Government Computer News*, Apr. 1, 1988, v. 7, n. 7, p. 17(1).
Lawrence Rabiner and Biing–Hwang Juang, Fundamentals of Speech Recognition, Prentice Hall PTR (Englewood Cliffs, New Jersey, 1993).

*Primary Examiner*—James P. Trammell
*Assistant Examiner*—Demetra R. Smith
*Attorney, Agent, or Firm*—Engate Incorporated

[57] ABSTRACT

The present invention provides attorney terminals which operate using an outline for storing, associating and managing case evidence, case law and work product for a given lawsuit at issue. Accessed through attorney terminals, the outline is structured based on a hierarchical categorization of the lawsuit into the law and fact at issue. Associated with each categorization entry in the hierarchical outline are groupings of case law, case evidence, relevance and draft discovery information for rapid access by the attorney. Each categorization entry in the tailored outline provides instant access to case law via headnotes, treatise selections, seminal cases, and preset searches. The disclosed invention also automatically: 1) tracks the use of Exhibits in a proceeding; 2) generates draft portions of a pretrial order including jury instructions; and 3) generates time-lines for analysis and use during a proceeding. Draft interrogatories, document requests and deposition or trial questions are also provided.

20 Claims, 20 Drawing Sheets

ATTORNEY TERMINAL HAVING OUTLINE PREPARATION CAPABILITIES FOR MANAGING TRIAL PROCEEDINGS

CROSS-REFERENCE TO RELATED APPLICATIONS (Claim Of Benefit Under 35 U.S.C. 120)

This application is a continuation of application Ser. No. 08/518,102 filed Aug. 22, 1995 U.S. Pat. No. 5,815,392, which is a continuation of application Ser. No. 08/326,742 filed Oct. 20, 1994, now U.S. Pat. No. 5,444,615, issued Aug. 22, 1995, which is a continuation of application Ser. No. 08/073,809 filed Jun. 7, 1993, now abandoned, which is a continuation-in-part of application Ser. No. 08/036,488 filed Mar. 24, 1993, now U.S. Pat. No. 5,369,704, issued Nov. 29, 1994.

INCORPORATION BY REFERENCE

The descriptive matter of application Ser. No. 08/518,102, application Ser. No. 08/326,742, now U.S. Pat. No. 5,444,615, application Ser. No. 08/073,809, and application Ser. No. 08/036,488, now U.S. Pat. No. 5,369,704, is incorporated herein by reference in its entirety, and is made part of this application. Also incorporated herein by reference in their entirety and made part of this application are pending U.S. applications by Bennett et al.:

1) Ser. No. 08/066,948, filed May 24, 1993, entitled "Audio and Video Transcription System for Manipulating Real-Time Testimony"; and
2) Ser. No. 08/065,132, filed May 20, 1993, entitled "Down-Line Transcription System Having Context Sensitive Searching Capability".

BACKGROUND OF THE INVENTION

This invention relates to a down-line transcription system used by attorneys for reviewing real-time transcription during a proceeding such as a trial or deposition; and, more particularly, it relates to a method and apparatus for interactively preparing an outline for use during such a proceeding based on case evidence and case law which may be locally or remotely located.

As is well known, legal proceedings such as a deposition or trial involve the participation of, among others, an examining attorney who asks questions and a witness who must answer ("testify") while under oath. To prepare for such proceedings, the examining attorney must review the applicable case law and the related case evidence. The attorney also consults experts, clients and other associate attorneys regarding specific issues of law and fact as proves necessary. During his investigation process the attorney takes notes, and makes copies of documents and legal cases regarding everything at issue. Based on these materials, the attorney attempts to develop a strategy, constructs an outline of possible lines of inquiry, drafts potential questions for the witness and organizes relevant documentary evidence for use as exhibits for the proceeding. During the entire process, the examining attorney attempts to anticipate all of the legal issues that might arise.

The entire preparation process often proves to be very time consuming and cyclical in nature. Every important fact uncovered leads to a new case law search. Similarly, every new legal issue leads to a need for additional facts that are found by conducting a case evidence search or are found by directly examining a witness. Because of this, lead attorneys on a case must be organized and skilled at memory recall.

The defending attorney must also attempt to understand the factual and legal issues in the case via case law and case evidence searching and through conversations with the client, expert witnesses, other attorneys and, most importantly, the witness to be deposed. During the entire process, the defending attorney's goal is to anticipate the strengths and weaknesses of the case and the factual evidence which may arise in the proceeding. The defending attorney must be well versed in all categories of the facts and law which might arise so as to be able to properly defend the witness. The defending attorney takes notes during his pre-investigation process to prepare the witness for the proceeding.

However, neither the examining attorney nor the defending attorney can anticipate everything. Typically, in the midst of a proceeding, the witness reveals something unexpected to one or both attorneys. The revelation could involve a new area of law which the attorneys know little if anything about. More often, the revelation suggests an unknown variant in a known category of law. The revelation also creates a need for additional documents for use during the proceeding to pursue the new issue. In all such situations, additional searching is needed. However, during the proceeding, because the attorneys do not have the luxury of time, outlining, legal researching, and factual evidence retrieval prove to be an impossibility.

Additionally, the examining attorney generally takes notes (1) on a legal pad of paper, (2) directly on copies of potentially relevant documents identified for use in the deposition, and (3) on Post-it® brand notes which are associated with the documents and other materials. During the proceeding, the attorney attempts to recreate the associations of the notes, the identified documents and draft questions with legal inquiries into the different categories of law. Because of disorganization, the attorney is often unable to use a great deal of the prepared information.

In complex litigation, the problems facing the attorneys are compounded. Because the preparation process becomes a very time consuming task, the lead examining (and defending) attorney delegates the task to an associate attorney on the case. The associate attorney, who often has lesser knowledge of the facts and law at issue, is faced with the task of retrieving the important case law and evidence which will be relevant in the upcoming proceeding. Because of lesser knowledge and inexperience, the associate attorney either over prepares or else complicates the matter by not culling out the appropriate law or facts. In addition, because the associate attorney must brief the lead attorney during a relatively short time period before the proceeding, the lead attorney cannot grasp all of what is attempted to be conveyed. Similarly, the associate attorney may convey a misconstrued understanding of the law and the evidence because of inexperience. Either way, the lead attorney often does not find out all he needs until the proceeding is underway.

In the midst of the proceeding, the examining attorney is also confronted with the problem of recalling the testimony of former witnesses regarding the same subject matter now being addressed. If recalled, the examining attorney may use the prior testimony to his advantage. Also, after the deposition, the attorney is faced with the problem of reorganizing the materials in some type of saveable form for later use when a similar witness is deposed.

Hence, it would be highly desirable to solve the foregoing variety of problems enumerated in preparing for legal proceedings such as a deposition or trial by guiding the attorney in the preparation process while associating all notes, documents and law into a workable format which requires minimal attorney interaction during the proceeding.

It is therefore an object of the present invention to provide a method and apparatus having interactive outlining capabilities based on tailorable, default outlines that provide immediate access to current case law, pre-typed tailorable and default questions while providing for association of case and witness specific notes, testimony, and other case evidence.

It is another object of the present invention to provide a method and apparatus for selecting a pre-typed outline based on categories or subcategories of law, by providing for interactive queries based on specific facts and law at issue in a given lawsuit.

It is another object of the present invention to provide a method and apparatus for interactively selecting a pre-typed outline based on categories or subcategories of law which contains tailored potential questions that may be further tailored for managing depositions, trial and case evidence, law and attorney work product.

SUMMARY OF THE INVENTION

These and other objects of the present invention are achieved in a transcription network having an outline used by attorney terminals for managing a lawsuit. The outline contains a plurality of categorization entries related to issues in a specific lawsuit. At least one of the plurality of categorization entries relates to a first data item of case law information. Similarly, the outline comprises a second data item of case evidence information relating to at least one of the plurality of categorization entries. Other objects are also achieved with the outline provides for the association of the first and second data items.

Objects are also achieved in a method for preparing to take the testimony of a witness including the steps of storing case evidence in a database, associating the evidence in the computer database with a deposition question or witness answer, and viewing this association. In another embodiment, associating the evidence includes associating the evidence in real time. In a further embodiment, case evidence includes testimony, pleadings, or documents, and the database includes either a local or remote database.

Other objects are achieved in a method used by an attorney terminal for a given lawsuit which comprises the steps of accessing an outline library that includes a number of outline areas related to witness testimony, and selectively using at least one of the outline areas for use in a given lawsuit.

In one embodiment, the method includes associating a plurality of preset examination questions with at least one outline area and storing preset examination questions in a database. In a further embodiment, the method further includes the step of tailoring the stored examination question so as to direct questions to a specific witness to be deposed. In yet a further embodiment, the method includes retrieving the stored examination questions during the examination of the witness in real time by addressing the stored outline areas to automatically retrieve associated questions.

Other objects and further aspects of the present invention will become apparent in view of the following detailed description and claims with reference to the accompanying drawings.

DESCRIPTION OF THE PREFERRED EMBODIMENT

Figure 1:
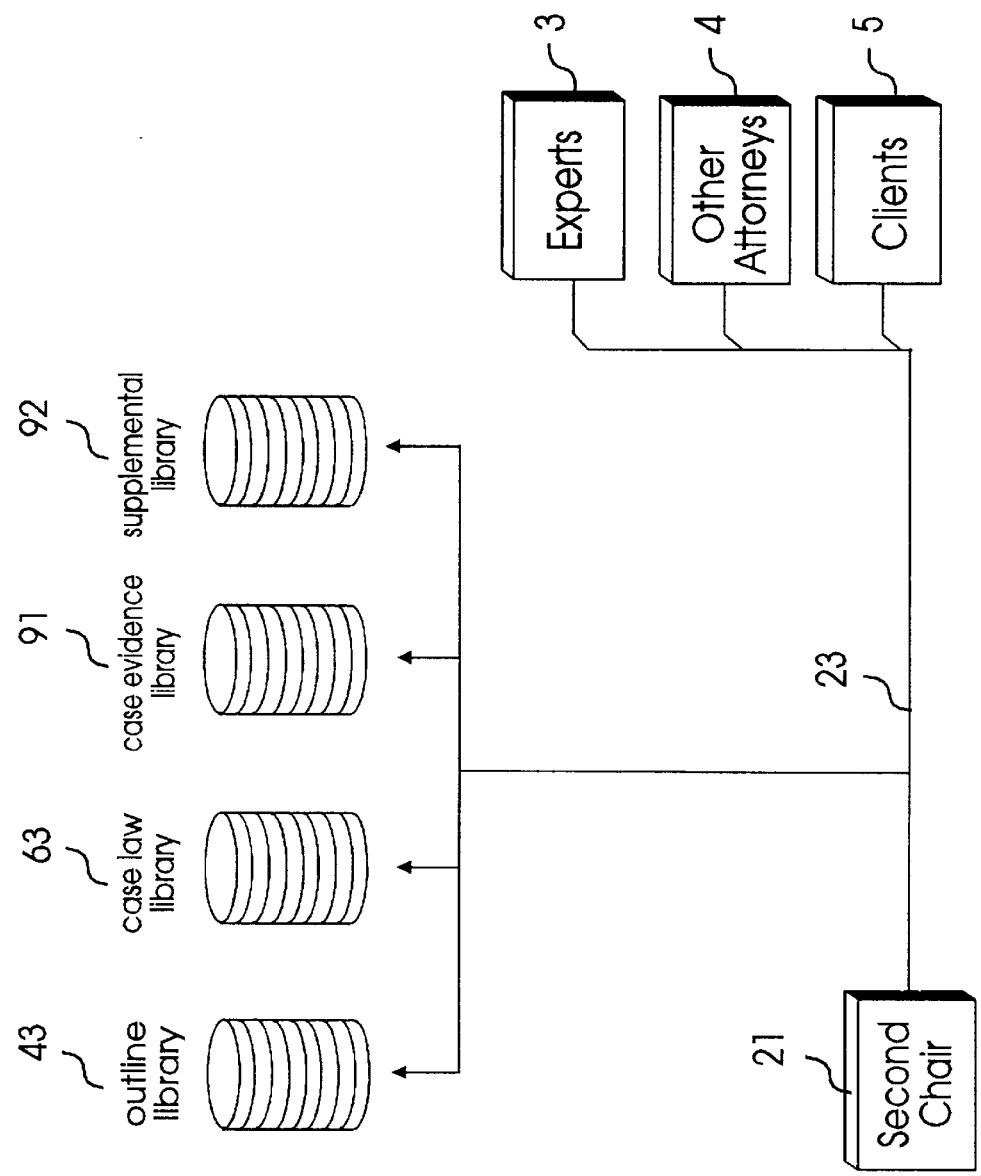
FIG. 1 is perspective view which illustrates an overall system configuration in which attorney terminals operate in Outline, Pretrial and Timeline Modes to manage a lawsuit according to the present invention.
Figure 2:
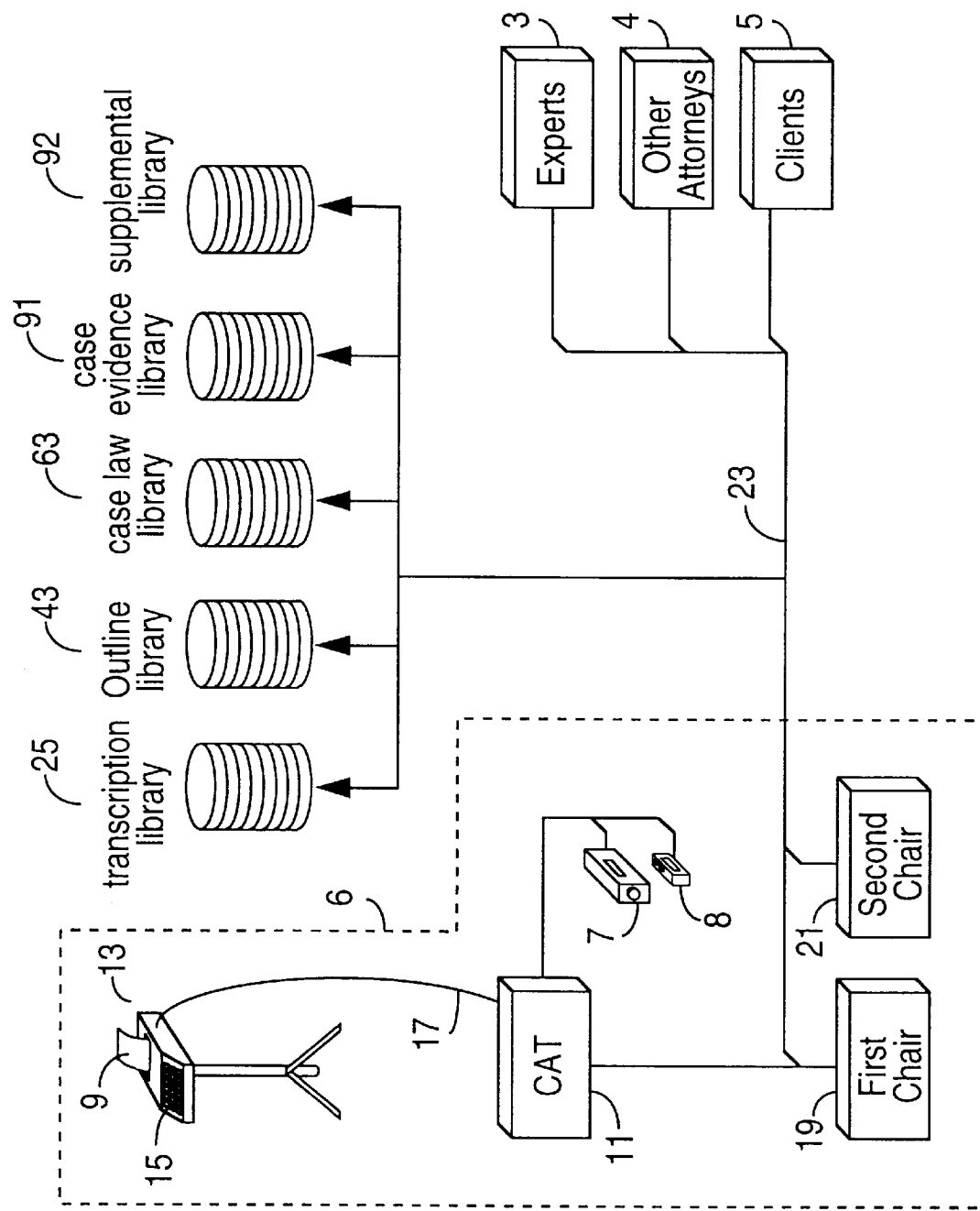
FIG. 2 is perspective view which illustrates an overall system configuration in which attorney terminals operate in Deposition and Trial Modes to manage a lawsuit according to the present invention.

FIGS. 1 and 2 are perspective views which illustrate overall system configurations in which attorney terminals operate in various modes to manage a lawsuit according to the present invention. In particular, FIG. 1 is a perspective view of a system configuration in which a second chair attorney prepares for a deposition or trial proceeding using an attorney terminal 21 which operates in an Outline Mode, Pretrial Mode, Timeline Mode and other modes.

Upon initiation of a new lawsuit, an attorney (generally the second chair attorney on the case) uses the attorney terminal 21 in its Outline Mode to prepare for conducting the new lawsuit. First, the attorney gains access to an outline library 43, and interactively responds to a query regarding: 1) the issues of law from the Complaint of the new lawsuit; 2) the State and/or Federal laws at issue; 3) the specific court involved; 4) the names of the parties; 5) the party represented; and 5) other specific factual information relevant given the law at issue. Thereafter, a second query interactively extracts information as to the Answer in the lawsuit, including all defenses and counterclaims at issue. A third query captures information regarding defenses to any counterclaims raised.

As an added advantage to the querying process, a plaintiff's attorney may access the outline library 43 to interactively construct the Complaint. The information provided to construct the Complaint provides all of the lawsuit information needed in the first query, and, therefore, does not need to be asked again.

Similarly, a defending attorney might access the outline library 43 and, after responding to the first query using the Complaint, the defending attorney might interactively construct the Answer in lieu of the second query. During the interaction, all possible legal defenses to the charges in the Complaint aid the defending attorney in drafting the Answer. To complete the Answer, the defending attorney may then add counterclaims, if any, and selectively choose those defenses which are appropriate for the current lawsuit. Similarly, a Reply to the counterclaims may be interactively prepared by the plaintiff's attorney. Moreover, headnotes, seminal cases, pre-typed searches, and comments regarding each charge raised and all potential defenses thereto aid the attorneys in preparing the Complaint, Answer, or Reply.

From the queried information, the outline library 43 provides a tailored outline corresponding to the issues in the case for conducting and managing the lawsuit. Basically, the tailored outline provides a hierarchical structure for associating the law at issue, case evidence, and attorney work product so that the attorney can easily access information retrieved from a variety of sources. At the root of the hierarchical structure, the outline provides all of the major categories of law and fact at issue in the lawsuit. Branches of the hierarchical structure, i.e., subcategories, sub-subcategories, etc., provide further and further levels of legal/factual detail regarding the major categories or subcategories.

Through the hierarchical structure of the outline, the attorney can rapidly access a desired grouping of evidence, law and work product pertaining to a solitary legal or factual issue. However, access is not the only benefit. Additional benefits include ease of closing off an area of inquiry. By closing off a subcategory, all of the further levels below that subcategory (sub-subcategories, etc.) are closed off, rapidly minimizing the size of the working outline. Moreover, the mere listing of all the potential areas of law provides the attorney with a hierarchical checklist, reminding the attorney of what law might be at issue. Other benefits enhance the attorney's ability to prepare for a legal proceeding by providing: 1) virtually instant legal overviews (headnotes) of the suggested categories and subcategories of law without having to conduct a search; 3) immediate access to the burdens of proof required; 4) pre-typed legal search formulations for further legal inquiry via a case law library 63; 5) instant access to the seminal case regarding the categories or subcategories; 6) pre-typed potential questions to be asked based on the current case and witness; 7) pre-typed potential interrogatories and document requests relating to the categories or subcategories; 8) the ability to associate case evidence, work product (notes, pleadings or portions thereof), or related communications with the categories or subcategories; 9) sequential and interactive guidance of the attorney through the hierarchical categorizations of law based on the attorney's response; and 10) where beneficial, suggestions of evidentiary searches and other discovery tips such as, for example, pertinent local court discovery rules.

On an ongoing basis, while in the Outline Mode, the attorney terminal 21, such as might be used by a second chair attorney, utilizes the retrieved tailored outline to begin a second level of case specific tailoring governed by the discovery process. As further evidence is obtained through discovery, the attorney continues to pursue deeper levels of some categories at issue, while closing off others.

To aid in the discovery process, the Outline Mode helps formulate interrogatories, document requests, and questions for upcoming depositions. To formulate document requests and interrogatories, the attorney first analyzes the categories, subcategories, sub-subcategories, etc., to become familiar with the potential issues in the lawsuit through the headnotes provided, and begins to construct document requests and interrogatories from sample, partially-tailored interrogatories available at each level of hierarchy. Partial-tailoring automatically occurs upon retrieval of the tailored outline from the outline library 43 via the initial stage of querying by substituting specific lawsuit information where appropriate into the text of the sample document requests and interrogatories. Such tailoring minimizes the attorney's need for further modification. Upon completing the tailoring process within the hierarchical structure, the attorney terminal 21 extracts or "copies" all of the newly created document requests and interrogatories from the hierarchical structure and places them into draft discovery requests. After minimal further modification, the attorney is able to serve the requests on the opposing side.

The answers to the interrogatories are first placed into a case evidence library 91. From there, the attorney terminal 21, if so directed, automatically compares and updates the draft interrogatories in the tailored outline with those actually served, and then directly associates the received answers into the outline. In particular, the terminal 21 parses a text file of the served interrogatories into units of single interrogatories. Each of the served interrogatories are then compared to each draft interrogatory on an ordered word by word basis. The draft interrogatory providing the best match is displayed by the attorney terminal 21 along with the corresponding served interrogatory and a matching percentage (based on the number of matching words). Thereafter, the attorney terminal 21 prompts the attorney for verification. If the attorney verifies the match, the terminal 21 replaces the draft interrogatory with the served interrogatory, and associates the answer therewith. If the attorney does not detect a match, the attorney terminal 21 can be directed to display the draft interrogatory offering next best match. This process can continue until verification is received. If at any point during the verification process, however, the attorney detects that the served interrogatory has been newly added outside of the tailored outline, the attorney terminal 21 can be used to categorize that interrogatory within the appropriate hierarchical area(s) in the tailored outline. Once a draft interrogatory has been updated (or replaced) by a served interrogatory, it is taken out of consideration for further correspondence matching. Thus, the served interrogatories can be interactively imported back into the hierarchical structure of the tailored outline. If, however, the attorney makes all modifications to the draft interrogatories directly within the tailored outline, the importation process occurs rapidly and accurately to locate and associate the answers received.

After the importing process, the attorney is directed back through the hierarchical structure by the attorney terminal 21 to review the newly received interrogatories. By doing so, the attorney may choose to close off additional categories or subcategories of inquiry, or pursue others. In many circumstances, supplemental interrogatories may be in order after reviewing the responses. In such circumstances, the attorney may draft additional requests and, at some later time, extract the newly drafted requests for service. Moreover, any type of discovery request can be periodically drafted whenever the need arises. At any time, the attorney may extract a collection of the draft discovery requests for review, modification and service or use during a deposition or trial proceeding.

The attorney terminal 21 also automatically prepares draft document requests during a deposition or trial proceeding. For example, if during a deposition the examining attorney asks opposing counsel to produce documents which the witness has identified, the attorney terminal 21, monitoring the transcribed text, detects the question to the opposing counsel, detects the use of the word "produce", concludes that a formal request needs to be made, and prepares a draft document request based on the interchange between the attorney and the opposing counsel.

If during the process of reviewing responses the attorney recognizes that an unanticipated area of law might be at issue, the attorney merely gains access to the outline library 43, enters the unanticipated area of law, and the attorney's tailored outline is updated to include all of the categories and subcategories and related information regarding the unanticipated area of law for review.

Depending on the lawsuit budget and the number of items anticipated, the documents and things produced may be entered into the case evidence library in a variety of ways. Where possible, all documents received are immediately scanned and converted to text via an optical character recognition ("OCR") process. The scanned documents and the corresponding text are stored in the case evidence library 91. Summaries describing the "things" produced are also added to the library 91. In alternate situations, only summaries for all of the documents and things received are loaded into the case evidence library 91. In yet other situations, only summaries or scanning is used for documents and things identified as being significant.

The attorney interacts with the documents and things received for annotation and association into the hierarchical structure of the tailored outline. If the documents have been scanned, the attorney terminal 21 can be used to display all documents by Bates number for review by the attorney. If the corresponding text of the documents has been extracted, the attorney may search the corresponding text to identify all documents which contain key words or names, for example. Doing so minimizes the quantity of documents that an attorney needs to review for a specific purpose. Although all documents may be scanned and converted, in many lawsuits, only specific documents may be scanned and/or converted. Summaries might also be used either as an annotation to scanned documents, or as a stand-alone index to the actual documents via the Bates numbers.

As each document is reviewed, the attorney may choose to add textual annotations thereto, and may also choose to associate documents with a specific categorization entry in the tailored outline. Furthermore, the attorney may choose to directly associate the document with a pre-typed or actual deposition question, a specific case law headnote, a treatise selection, or any other data stored within a given categorization entry.

To better automate the process of association, the attorney terminal 21 directs the attorney through the draft document requests in the hierarchical structure of the tailored outline. From the draft document requests extracted, the attorney modifies and serves the document requests. In a process identical to that available for interrogatories, the attorney terminal 21 provides for interactive importation of the served document requests into the tailored outline. Thereafter, on a document request by document request basis, each Bates stamped document produced can be scanned and immediately associated with the corresponding served document request in the hierarchical structure of the tailored outline. Thus, to review all documents relating, for example, to an oral contract, the attorney first uses the terminal 21 to access the categorization entry corresponding to oral contracts within the tailored outline. Upon accessing the entry, all of the documents stored therein (or associated therewith) can be directly accessed. Documents and things can also receive multiple associations under multiple categorization entries as proves necessary. This is accomplished using an associate/copy command sequence via the command line 33. Similarly, associate/move or associate/delete command sequences can be used to modify associations.

During the reviewing process, the attorney marks all significant documents, and may annotate the documents as needed with text or voice. In addition, during the process, additional discovery requests or unanticipated areas of law may come to light. The discovery requests may be drafted and associated with specific documents and/or annotations for later extraction for formal service. Any unanticipated areas of law can be retrieved from the outline library 43 to supplement the tailorable outline.

The tailored outline also provides sample draft deposition questions within each category or subcategory (i.e., each categorization entry) of its hierarchical structure. The attorney can mark those which might prove advantageous for potential modification and use during an upcoming deposition or trial. If so desired, additional questions might also be drafted within the hierarchical structure. To aid in this process and because of the diversity of the backgrounds of potential witnesses, different subcategory groupings of questions are provided for the different types of witnesses. For example, technical questions might be grouped for technical witnesses being deposed which might be ignored for a non-technical witness. Similarly, questions for expert witness extracting opinions might be appropriately grouped.

In addition, as described in more detail below, during a deposition while operating in the Deposition Mode, questions and answers are automatically associated with the appropriate categories and subcategories in the hierarchical structure, providing further groupings of potential questions. Specific questions used during prior depositions can thereafter be selected and possibly refined for use in an upcoming deposition with a different witness.

Where appropriate, each category and subcategory of tailored outline provides instant access to headnotes, associated full text of seminal cases, and pre-typed search requests to supplement the attorney's understanding of the specific law at issue. The outline library 43 draws and updates such legal information via a case law library 63. At any time during the lawsuit, the attorney may compare and update the legal information contained in the tailored outline via a comparison process with the outline library 43 which is maintained as legally "current". Any differences detected are flagged and sequentially presented to the attorney via the terminal 21 for immediate consideration of possible impacts on the ongoing lawsuit. The tailored outline is thereafter updated to reflect the current state of the law.

Using the attorney terminal 21, the attorney can directly tap into further legal and evidentiary information of expert witnesses, associate attorneys and clients via communication over the link 23 with corresponding terminals 3, 4 and 5. For example, while contemplating a specific subcategory in the tailored outline, the attorney realizes that the client might possess needed factual information at issue. Instead of calling the client, the attorney types in a message, and associates therewith any information grouped within that subcategory as deemed necessary to clarify the request. Such information might include the specific discovery requests, documents, answers, etc., which raised the need for the information. The message and associated information is then forwarded to the client via the communication link 23 to the terminal 5. After reading the communication, the client responds via the link 23. Upon receipt of the response, the tailored outline automatically stores the client's response within the hierarchical category from which the request originated. In this way, further evidence or law can be collected to further tailor the outline.

Once discovery has been completed, the attorney uses the tailored outline to aid in the preparation of the pretrial order in a Pretrial Mode. First, in the Pretrial Mode, the terminal 21 automatically generates a list of all Exhibits and other documents or things which have been marked as significant. This list provides the attorney with a starting point for identifying a list of Exhibits for trial. Using the terminal 21, the attorney can immediately access all annotations and the subcategory or subcategories in which a potential Exhibit was associated. With such access, the attorney can readily determine whether the potential Exhibit should be removed from the list.

Similarly, designated deposition testimony may be easily identified while in the Pretrial Mode. Upon request, the terminal 21 automatically extracts all question and answer interchanges deemed during the deposition proceeding to be important, i.e., through marking. The terminal 21 displays all such important interchanges for review by the attorney to determine whether they might be useful at trial. All of the associated annotations to the interchanges are also available to aid in the determination.

The Pretrial Mode also provides for a draft set of jury instructions for the Pretrial Order. Specifically, operating from the tailored outline, the attorney terminal 21 automatically generates a set of draft jury instructions based on the categories and subcategories of law still at issue upon completion of the discovery process. Although the draft jury instructions are preferably stored within the hierarchical structure of the tailored outline, they may be interactively retrieved using the outline library 43.

The attorney terminal 21 also provides potential witness and expert witness lists while in the Pretrial Mode. All parties which have been deposed are immediately listed as potential candidates. Any party having been deposed which is removed from a list, automatically cues the terminal 21 to designate the deposition in a list of depositions, or portions thereof, to be read in at the trial. To further aid the attorney, the terminal 21 identifies those portions of the designated deposition transcripts which have been previously marked as significant as being the portions to be read into the record during the trial. The witness lists and designations, along with the other pretrial information generated, provide the attorney with a reasonable starting point when preparing the Pretrial Order.

At any time during the discovery process or thereafter, the attorney terminal 21 may also be used in a Timeline Mode. In the Timeline Mode, the terminal 21 automatically searches through the evidence referenced in the tailored outline to identify dates and times, and then places the references in a chronological order for attorney review. As a default, only the documents and things and portions of the depositions that have been marked as significant are considered for the search. However, the scope of the search can be broadened or narrowed to encompass other documents and the full transcripts of the proceedings.

The terminal 21 also provides for designation of a specific time frame searching restriction to limit the search to the time period of an important event, for example. Similarly, to limit the scope of a search, only a single subcategory or group of subcategories can be chosen so as to confine the search to the evidence associated with those subcategories. Lexical searching can be combined with time line searching to help focus the information retrieved.

Once a chronologically ordered time-line listing has been retrieved, the attorney terminal 21 provides for an interactive review of the evidence associated with each entry so that entries may be deleted or else summarized. Thereafter, the terminal 21 provides for the display and printout of the summarized remaining entries in a graphical time-line format.

FIG. 2 is perspective view of a system configuration in which first and second chair attorneys utilize the information obtained from the tailored outline in the Outline Mode to conduct a deposition or trial proceeding, while operating attorney terminals 19 and 21 in a Deposition or Trial Mode. In the illustrated configuration, a computer aided transcription ("CAT") system 11 provides real-time, down-line transcription for down-line review by the attorney terminals 19 and 21. As questioning is conducted, the attorney terminals 19 and 21 operate within the hierarchical structure of the tailored outline so as to retrieve the transcript (the Q & A's), storing it into the hierarchical structure as the proceeding is taking place. Operation within the hierarchical structure occurs naturally because the attorneys use the hierarchical structure of the tailored outline as the basis for conducting the questioning. Moving through the structure may either be managed by the first or second chair attorneys.

As will suggest itself, the Deposition Mode need not be used to automatically retrieve the transcript into the tailored outline. Instead, an attorney (or paralegal) may categorize the Q & A's ("questions and answers") after the deposition has ended. The attorney may also choose to only categorize those Q & A's believed to be significant. This post-proceeding categorization process takes place directly via interactive review of the transcript while moving through the hierarchical structure of the tailored outline. As an intermediate step, the attorney may manually mark-up the transcript, and have a paralegal perform the interactive post-proceeding categorization.

In one embodiment, deposition transcripts, annotations, scanned documents, etc., and other case evidence is stored in the case evidence library 91. The supplemental library 92 stores draft discovery, jury instructions, etc. Similarly, all case law, treatise selections, etc., are stored in the case law library 63. The outline library 43 only stores the hierarchical structure of the tailored outline which provides pointers to and associations between the case law, case evidence and supplemental information stored in respective libraries 63, 91 and 92. These libraries may be in entirely separate databases, or in allocated portions of a single database. In an alternate embodiment, the tailored outline stores all of the case evidence, case law, and supplemental information directly into the hierarchical structure of the tailored outline.

Upon interacting with outline library 43, the attorney terminal 21 may extract and store the tailored outline locally. However, the tailored outline may be fully stored and maintained by the outline library 43, alleviating the need for local maintenance.

Specifically, at a trial or deposition, a stenographic recorder 13 converts key-strokes entered by a court reporter via a keyboard 15 into digital codes. The digital codes are intended to correspond to the words spoken at the deposition or trial. The stenographic recorder 13 communicates the key-stroke codes to the CAT system 11 via a link 17. Upon receipt, the CAT system 11 attempts to transcribe the key-stroke codes into the exact text of the words which were spoken to provide for a real-time textual display of the transcript. To do so, the CAT system 11 communicates with a number of libraries, dictionary, index and tables stored in a database 25. The CAT system 11 transmits the exact and, where necessary, phoneme text down-line to the attorney terminals 19 and 21 via a communication link 23 for real-time review. Further detail regarding code-to-text conversion process and the down-line attorney terminals can be found in the pending parent U.S. application Ser. No. 08/036,488, filed Mar. 24, 1993, which is incorporated herein by reference.

In addition to the textual transcript which is generated, the CAT system 11 also provides access to audio and video transcripts which may also be fully or selectively associated into the hierarchical structure of the tailored outline. The CAT system 11 utilizes a tape recorder 8 and a video camera 7 as a basis for creating the audio and video transcripts. Further detail regarding the creation and association of the audio and video transcripts can be found in pending U.S. application Ser. No. 08/066,948, filed May 24, 1993, entitled "Audio and Video Transcription System for Manipulating Real-Time Testimony", by Bennett et al., which is incorporated herein by reference.

If unanticipated areas of law arise at a deposition when terminals 19, 21 are in a Deposition Mode, the attorney terminals 19 or 21 may choose to update the tailored outline and access the law via the outline library 43, or may choose a direct search via the case law library 63. The advantages of the former option include the associated retrieval of not only headnotes and seminal cases, but also the pre-typed questions for immediate use during the proceeding. Similarly, the case evidence library 91 can be further searched during the proceeding as the need arises. Further detail regarding searching of the current transcript, case law library 63, and case evidence library 91 can be found in pending U.S. application Ser. No. 08/065,132, filed May 20, 1993, entitled "Down-Line Transcription System Having Context Sensitive Searching Capability", by Bennett et al., which is incorporated herein by reference.

While in the Deposition or Trial Mode, experts, other attorneys and clients may receive the transcripts down-line and/or may communicate to the attorney terminals 19 and 21 via the terminals 3, 4, and 5 via the link 23. During the proceeding while in the Deposition or Trial Modes, all such communications are directly associated into the hierarchical structure of the tailored outline as similarly occurs in the Outline Mode.

Figure 3:
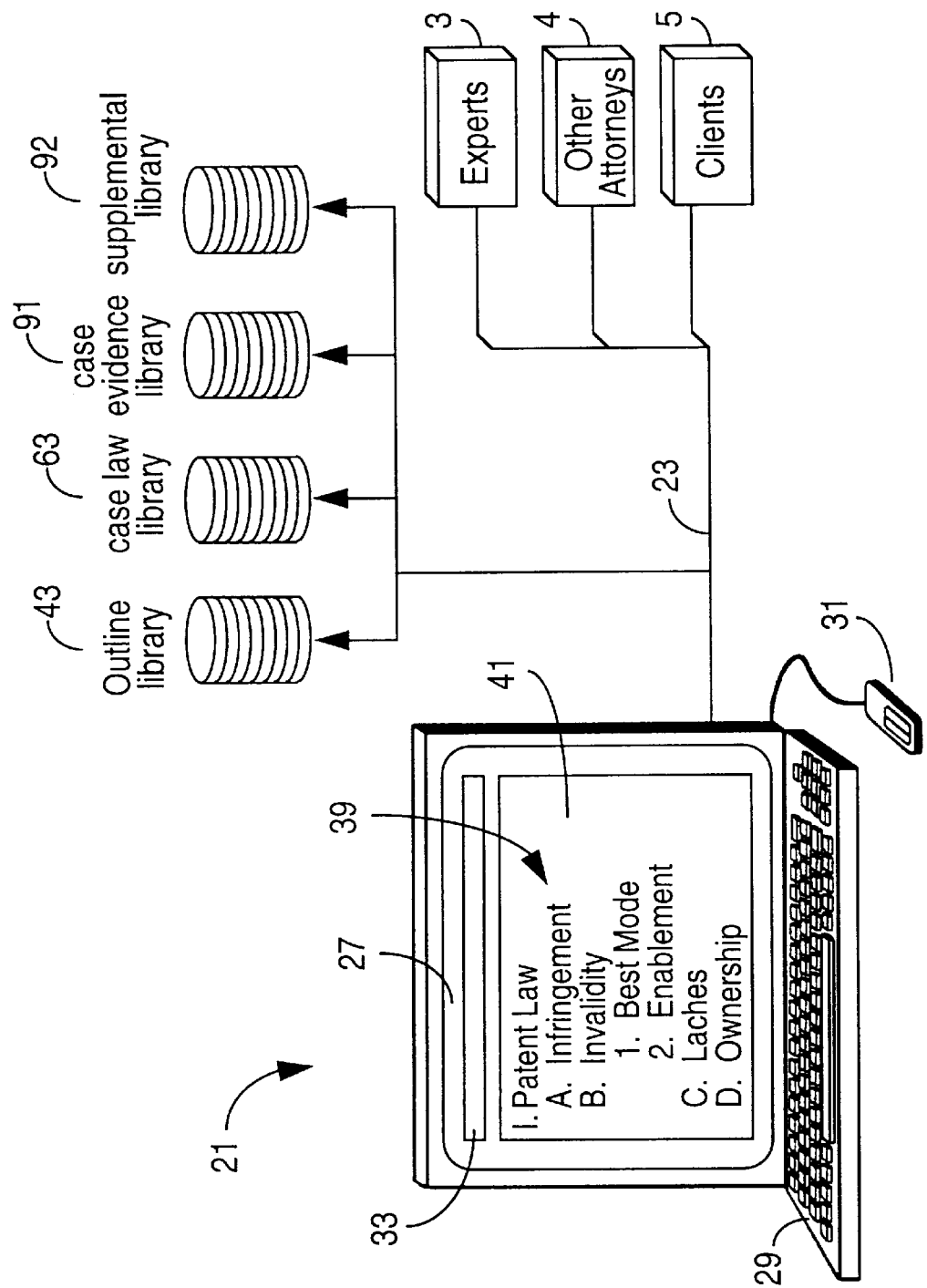
FIG. 3 is a detailed perspective view illustrating an attorney terminal in an Outline Mode configuration as used by an attorney to prepare for a deposition or trial proceeding according to the present invention.

Referring to FIG. 3, in the Outline Mode, an outline window 41 is created which covers a substantial portion of a screen 27 of attorney terminals such as the terminal 21. The attorney may build an outline 39 entirely from scratch using a keyboard 29, a mouse 31, and a command line 33. Basically, the building process involves listing each legal (and sometimes factual) category at issue and subcategories thereof into a typical Roman numeric format of the outline 39. Thereafter, associated within the hierarchical structure of the categories, pre-typed questions can be added to prepare for a deposition or trial, legal research might be obtained from the case law library 63, specific documents might be scanned or summarized and associated therewith, etc., as described above.

Instead of starting completely from scratch, however, the attorney might begin the process by copying an outline or portions thereof from a similar lawsuit. By copying, the attorney can quickly and easily make modifications for the current lawsuit, while taking advantage of all of the legal information and work product contained therein.

In addition, the attorney can build the outline 39 as described above through interactive session(s) with the outline library 43. The outline library 43 may be stored either remotely or locally.

Figure 4A:
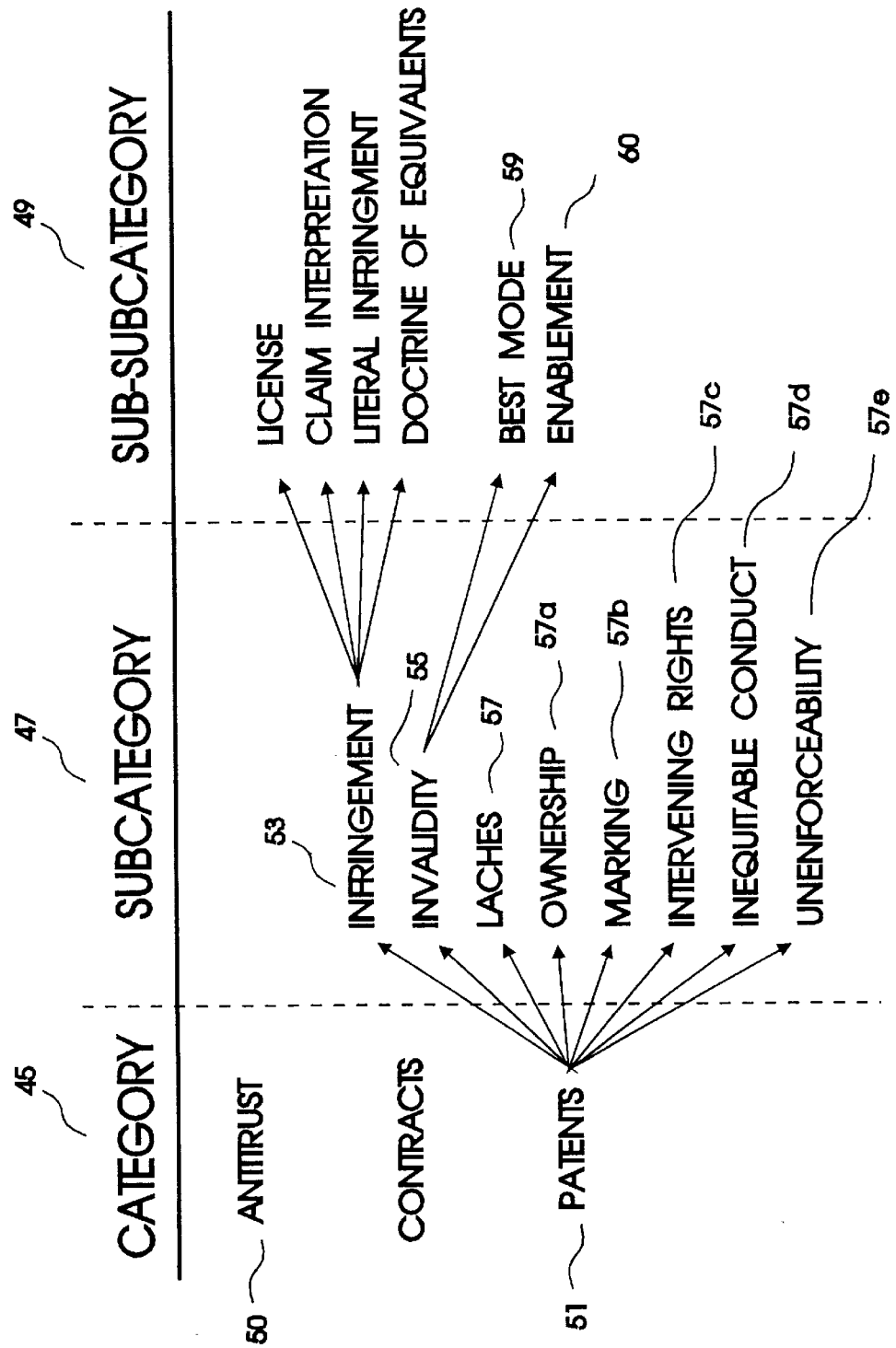
FIG. 4a is a diagram illustrating the hierarchical structure of the outline library according to the present invention which is interactively used by the attorney terminals to create a tailored outline for a given lawsuit.

Referring to FIG. 4a, the outline library 43 is hierarchically structured by category 45, subcategory 47, sub-subcategory 49, and so on. Broad areas of law provide the category 45 entries. Each category 45 entry may be broken down into one or more subcategory 47 entries, each of which in turn are broken down into one or more sub-subcategory 49 entries, and so on. For example, the category 45 includes a patent law entry 51. The patent law entry 51 is further broken down to subcategory 47 entries of infringement 53, invalidity 55, laches 57, etc. The subcategory "invalidity" 55 is broken down into sub-subcategory 49 entries of "best mode" 59 and enablement 60. Under each sub-subcategory area may be one or more sub-sub-subcategories, and so on. In some cases, the categories used in the outline may be a reference to an area of evidentiary inquiry which is not an area of law. For example, the category 45 could contain an entry "Background" having subcategory 47 entries for each witness or companies involved. Sub-subcategory 49 entries could include "Educational History", "Employment History", "Company Origin", etc.

Through the querying process between the attorney and the outline library 43, the attorney terminal 21 extracts a tailored outline for only those category, subcategory, etc., entries with indicated relevance in the particular lawsuit at issue. For example, in a lawsuit involving a patent count and an antitrust counterclaim, only the patent 51 and antitrust 50 entries in the category 45 would be included in the tailored outline. Moreover, in addition to selecting appropriate category 45 entries, the early query process also provides for automatic selection of the subcategory 47, sub-subcategory 49, etc., entries where possible.

Figure 4B:
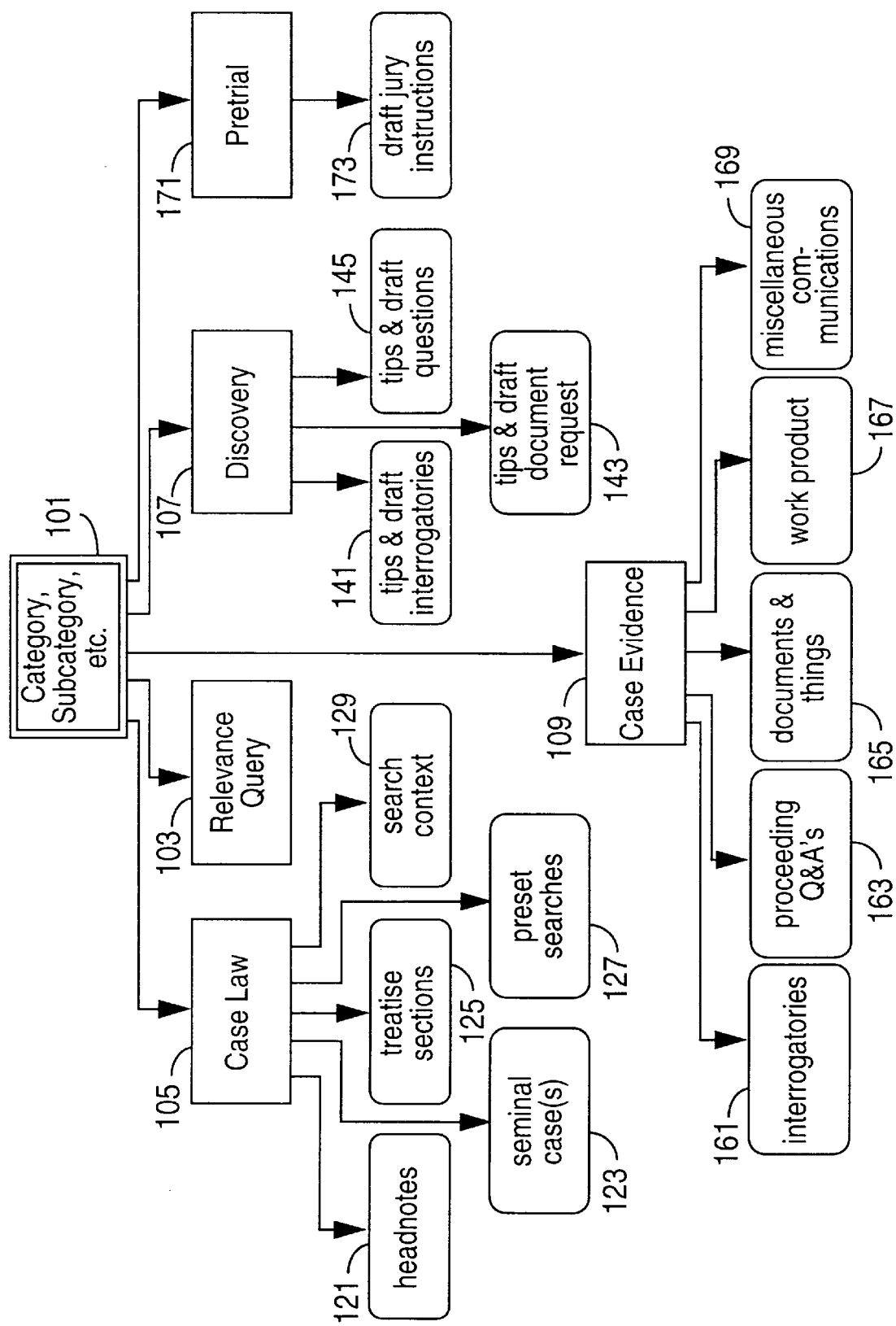
FIG. 4b is a detailed diagram illustrating the types and groupings of information contained within each hierarchical category, subcategory, etc., of the outline library according to the present invention.

Referring to FIG. 4b, each entry in the outline library 43 contains a hierarchical framework of groupings of information for use by the attorney to manage a lawsuit. In particular, each category, subcategory, etc., entry, such as an entry 101, in the outline library 43 is hierarchically and directly associated with a relevance query grouping 103, a case law grouping 105, a discovery grouping 107, and a case evidence grouping 109. Where appropriate, the relevance query grouping 103 contains library pointers to a variety of textual queries stored in the supplemental library 92 that are used to determine whether a specific entry, the entry 101, is relevant in the case at issue.

The case law grouping 105 provides the attorney with a concise overview of the law at issue (i.e., the law listed in the entry 101). The case law grouping 105 consists of: 1) a headnote pointer structure 121, i.e., pointers to headnotes stored within the supplemental library 92 which provide an overview of the law at issue and identifying the associated burdens of proof; 2) a seminal case pointer structure 123, i.e., pointers to a seminal case or cases regarding the entry 101 which are stored within the case law library 63; 3) a selected treatise section structure 125, i.e., pointers to selections from respected treatises regarding the entry 101 which are stored in the supplemental library 92; 4) a preset search structure 127, i.e., pointers to a list of search requests stored in the supplemental library 92 which are designed, for example, to retrieve the most recent relevant cases from the case law library 63 which relate to the entry 101; 5) a search context structure 129, i.e., a pointer or pointers to search context information stored within the supplemental library 92 which, for example, provides default log-in and library information for the case law library 63 to accelerate any searching conducted within the entry 101. If, however, the entry 101 happens to be an evidentiary entry, the entire case law grouping 105 may be empty. Where appropriate, prior to extracting the tailored outline from the outline library 43, the case law information provided by the case law grouping 105 receives specific tailoring to remove unnecessary details of case law which through the querying process prove to have no relevance in the specific lawsuit at issue.

Similarly, the discovery grouping 107 provides the attorney with a draft interrogatory pointer structure 141, a draft document requests pointer structure 143, and a draft question pointer structure 145 to access data items from the supplemental library 92 which the attorney may use to assist in the discovery process relating to the entry 101. Prior to extracting the tailored outline from the outline library 43, the draft discovery of the discovery grouping 107 receives specific tailoring by weaving the lawsuit specific information obtained through the querying process into draft discovery, and by removing discovery determined by the querying process to be irrelevant in the current lawsuit. Where beneficial, all of the draft discovery listings include tips and tactics regarding the discovery process of the entry 101.

The case evidence grouping 109 provides empty pointer structures to data items which the attorney adds to the case evidence library 91 over the entire duration of the lawsuit. Specifically, for served interrogatories and responses thereto which relate to the entry 101, an interrogatory pointer structure 161 is provided. For the questions and corresponding answers recorded during a deposition or trial relating to the entry 101, a Q&A pointer structure 163 is provided. Similarly, a document and things pointer structure 165 is provided for storing pointers to the produced documents and things relating to the entry 101. In addition, other pointer structures might also be included such as, for example, a work product pointer structure 167 (for pointing to annotations, notes, pleadings, etc.) and miscellaneous communications pointer structure 169 (for pointing to communications received from experts, other attorneys, clients and the so called Artificial Intelligence routines of the attorney terminals).

Additional groupings such as a pretrial grouping 171 (which contains pointers to a set of jury instructions 173) may also be provided by the outline library 43. Moreover, other groupings might be added by the attorney manually. Groupings that the attorney decides are unnecessary may be easily removed from the tailored outline upon extraction from the outline library 43 or at any time thereafter. If the attorney later determines that an unextracted or deleted grouping is needed, the tailored outline can be appropriately updated by interactively revisiting the outline library 43. Because many lawsuits span a several year period, the attorney may also periodically revisit the outline library 43 to update the groupings and data items thereunder. Of particular significance here involves updating the case law grouping 105. All of the specifics regarding the changes or additions made to the tailored outline can be reviewed interactively by the attorney as the update takes place, or after the update has been completed. The update review allows the attorney to consider the impact of the update changes and additions.

The outline library 43 also contains preset associations between the groupings of the various categorization entries where appropriate to assist the attorney in evaluating the tailored outline which has been extracted. For example, a specific draft interrogatory under one categorization entry might have preset associations with a headnote from the same entry, and with a treatise selection from a different categorization entry. In this way, the attorney can quickly display the legal basis behind the draft interrogatory. With the preset association framework provided by the outline library 43, the attorney need only create supplemental associations with specific case evidence, work product, etc., which comes to light during the lawsuit.

As previously articulated, although in the embodiment described in relation to FIG. 4b only structures of pointers to information are associated with a given categorization entry, in an alternate embodiment, instead of pointer structures, the actual information is stored within the hierarchical structure of the tailored outline. In addition, the pointer structures are merely linked-lists of pointers; however, various other data structures for associating pointers might also be used.

Once a tailored outline with its associated information groupings is extracted from the outline library 43, the attorney might further tailor the outline by: 1) manually adding new category, subcategory, etc., entries; 2) adding to or modifying the contents of any of the groupings provided thereunder; 3) combining groupings or portions thereof; and 4) adding new groupings. Moreover, as previously stated, at anytime thereafter, the attorney may gain access to the outline library 43 to update or extract additional entries from the outline library 43 into the attorney's tailored outline.

Specifically, if the tailored outline is to be stored and maintained within the outline library 43, the extraction process involves the copying of the selected hierarchy of the categorization entries (along with associated information groupings), i.e., the tailored outline, into a working file stored within the outline library 43. Although not necessary, at any time thereafter, the attorney may choose to down-load the tailored outline, or portions thereof, for separate storage and maintenance. Alternatively, the extraction process might involve the direct down-loading of those portions of the outline library 43 selected as being part of the tailored outline. In such circumstances, permanent or intermediate storage and maintenance of the tailored outline within the outline library 43 would not be needed.

The attorney utilizes the tailored outline to begin filling the case evidence grouping 109 of each entry 101 in the tailored outline. For example, scanned documents are first directly stored into the case evidence library 91. Upon reviewing a given document, the attorney may identify an appropriate categorization entry 101, and store a pointer to that document in the document and things pointer structure 165.

Concurrent with the filling process, the attorney marks evidence entered as significant, annotates, and makes specific associations where beneficial. For example, during a deposition, the attorney may annotate a given answer, or, while reviewing documents, the attorney might annotate a specific document. Annotations are stored in the case evidence library 91 and pointed to via the set of work product pointers 167.

Annotations are directly associated for example with a seminal case, an interrogatory, or any other unit of data within the entry 101 groupings. Associations may also be made between any such elements of information provided by the various groupings under the entry 101. For example, an association might be created between a document pointed to by the pointer structure 165 and a headnote from the pointers structure 121, or between a Q&A in one deposition with a Q&A from another deposition via the pointer structure 163.

Figure 4C:
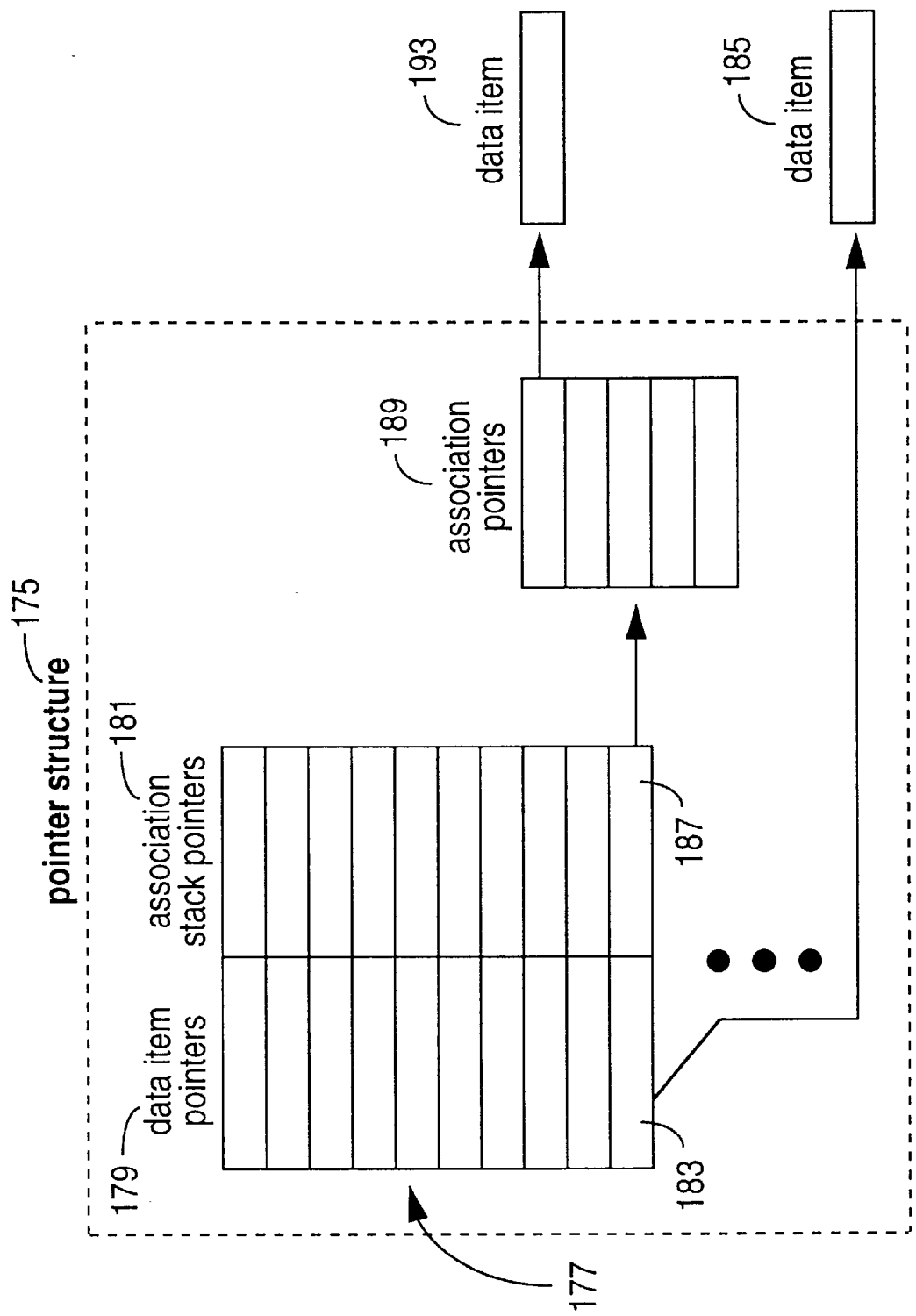
FIG. 4c is a diagram illustrating an exemplary pointer structure under the groupings in the tailored outline according to the present invention which provides access to and association information for each data item of the tailored outline.

FIG. 4c is a diagram providing an exemplary illustration of the pointer structures identified in FIG. 4b. Specifically, a pointer structure 175 (which is representative of any of the pointer structures of FIG. 4b) provides direct indexing of all data items within a specific grouping area, and indirect indexing of all associated data items. A pointer table 177 provides the basis for the indexing. The pointer table 177 contains entries for every data item contained within the specific grouping. For example, if the pointer structure 175 happened to be the headnote pointer structure 121 (FIG. 4b), each entry into the table 177 would correspond to a particular headnote associated with the categorization entry 101 (FIG. 4b).

Each entry in the table 177 consists of two fields: 1) a data item pointers field 179—each field entry for storing a pointer to a single data item, such as a data item 185, associated with the specific grouping; and 2) an association stack pointers field 181—each field entry storing a pointer to an association stack, such as an association stack 189. For example, if the pointer structure 175 happened to be the headnote pointer structure 121 (FIG. 4b), pointers to the text of each headnote would be stored in the data item pointers fields 179. A data item 185, i.e., in this example a single headnote, can be easily located via a pointer stored in an entry 183 of the fields 179. Similarly, to identify all associations made with the data item 185, a corresponding entry 187 provides a pointer to the association stack 189 which, in turn, provides a list of pointers each of which point to an associated data item. For example a pointer entry 191 stores a pointer which points to a data item 193 which has been associated with the data item 185.

When a new data item is added under a given grouping, a new entry is added to the table 177. If no associations exist to the data item, the newly added association stack pointers field 181 contains no pointer to an association stack. When an association is made, a new association stack is created with a single entry which contains a pointer to the association, and the pointer to the association stack is placed in the newly added association stack pointers field 181. In addition, the same process occurs for the data item being associated. For example, although not shown, wherever the data item 193 is directly referenced, an association stack will be created (or added to) to include an association to the data item 185.

Figure 5A:
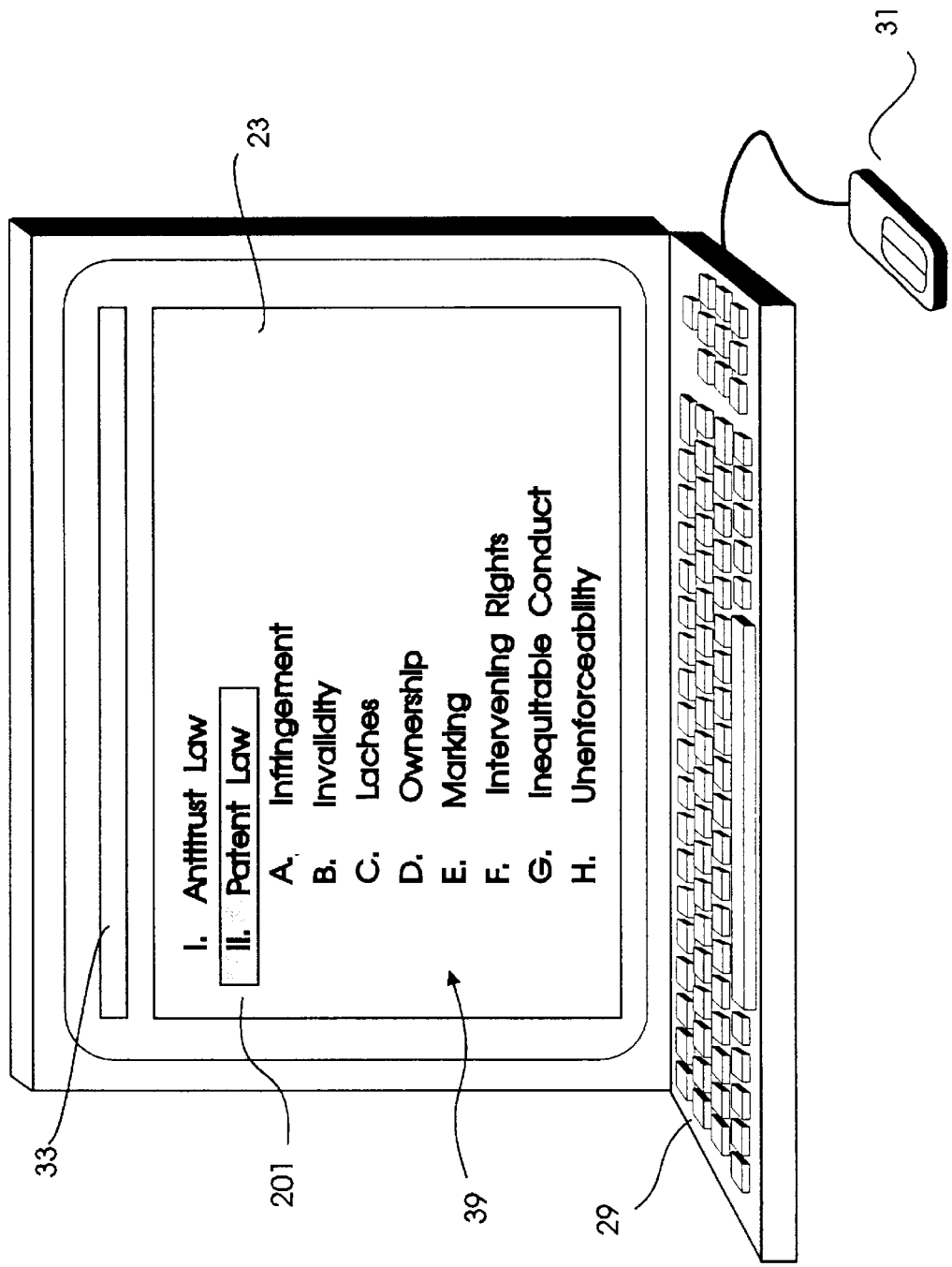
FIG. 5a is a detailed perspective view illustrating an attorney terminal which provides a Roman numeric outline display of the categories and subcategories contained in a tailored outline according to the present invention.

FIG. 5a is a detailed perspective view illustrating an attorney terminal which provides a Roman numeric outline display of the categories and subcategories contained in a tailored outline according to the present invention. As previously described, the tailored outline 39 might have: 1) originated in whole or in part from the outline library 43; 2) been copied from another lawsuit; or 3) created manually in whole or in part.

Figure 5B:
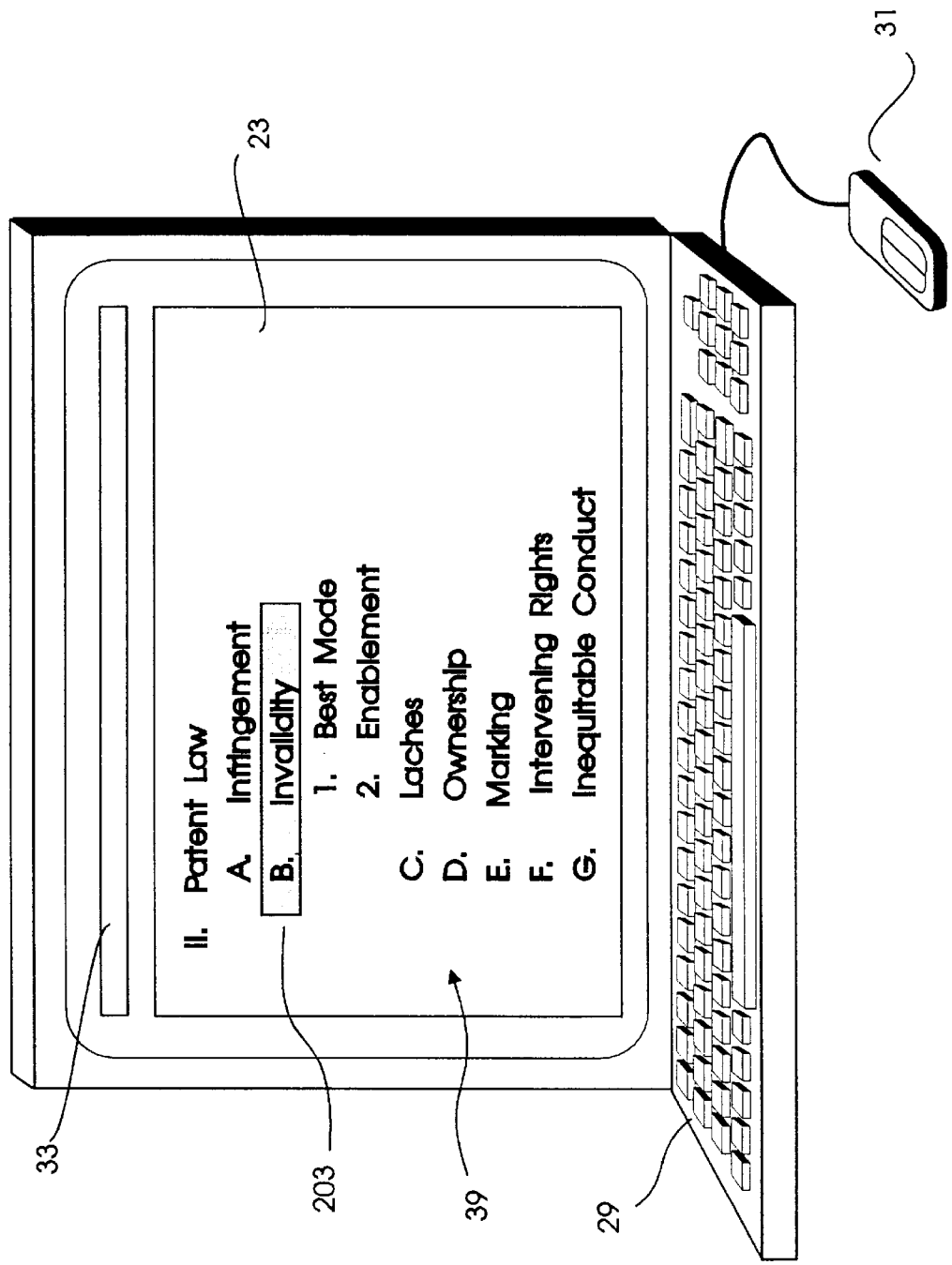
FIGS. 5b–5f are detailed perspective views of the attorney terminal of FIG. 5a which further illustrate how an attorney may move through, create, modify or otherwise use the hierarchical structure of the tailored outline according to the present invention.

To move through the tailored outline 39 using the Roman numeric display, a single click (button selection) of the mouse 31 of a "Patent Law" category entry 201 causes a deeper level of the hierarchical structure, i.e., the subcategories A–H, to either appear if they are not currently being displayed, or disappear if they are being displayed. In other words, the single clicking of the mouse 31 acts to expand or collapse a branch in the hierarchical structure of the tailored outline 39. Similarly, the attorney may expand or collapse any categorization level in the tailored outline 39. For example, referring to FIG. 5b, the attorney single clicks on the "Invalidity" subcategory entry 203, and the sub-subcategories 1–2 appear. Single clicking on the entry 203 a second time would likewise collapse the tailored outline back to the level shown in FIG. 5a.

Figure 5C:
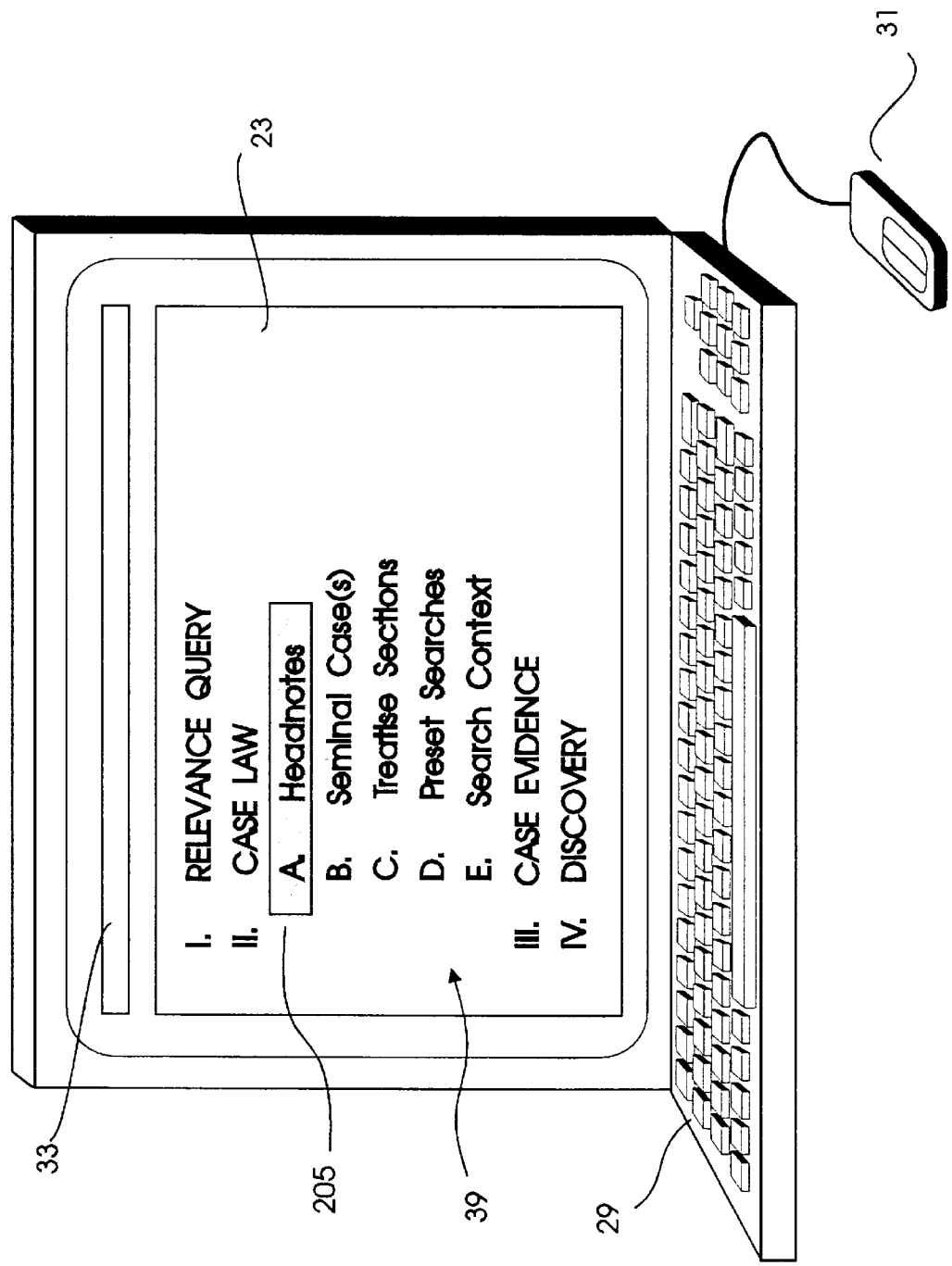
Figure 5D:
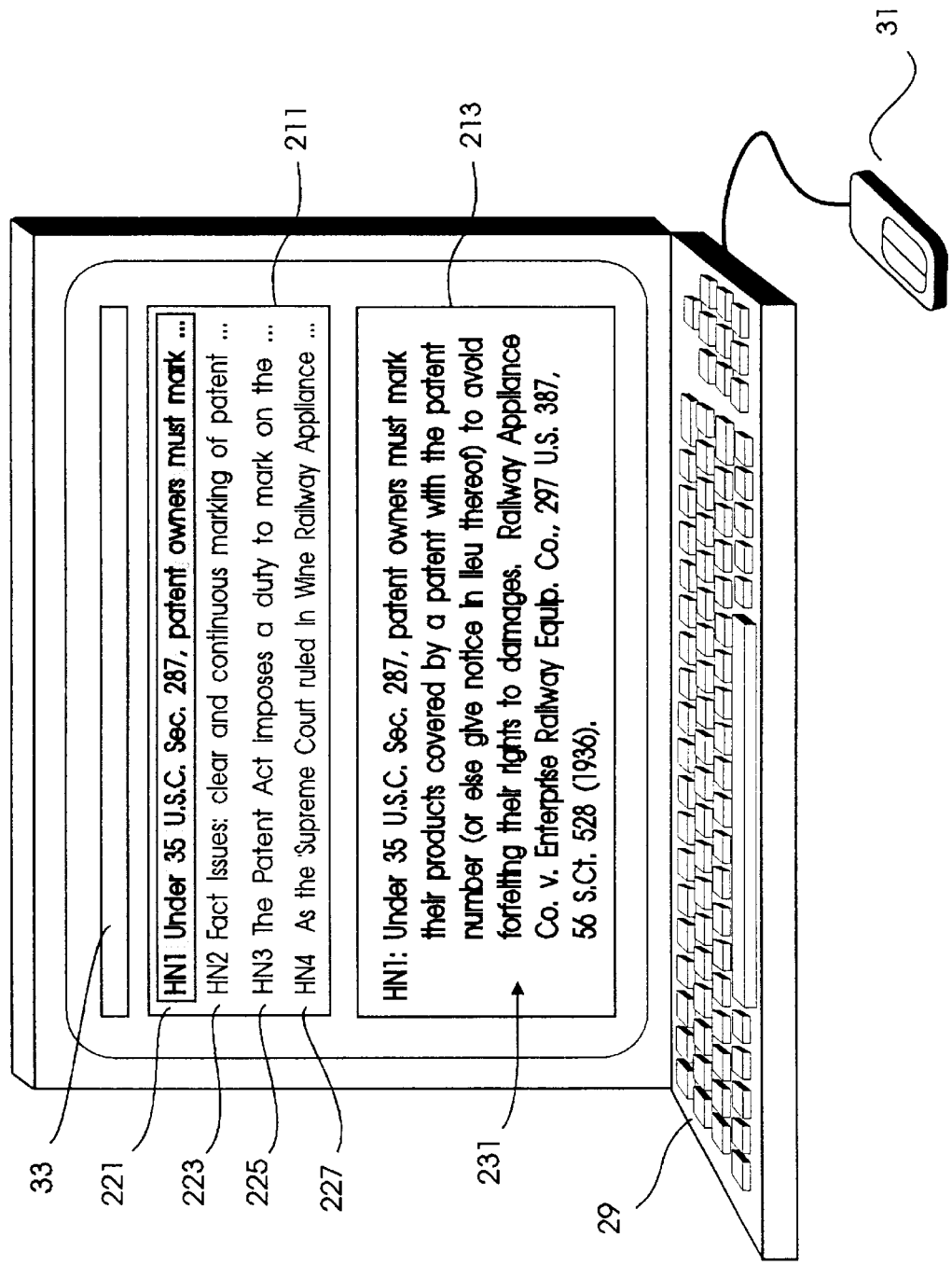

While using the Roman numeric display, the information contained within any category, subcategory, etc., in the tailored outline 39 can be accessed by "double clicking" the mouse 31, i.e., two sequential button selections of the desired category, subcategory, etc. After double clicking, the screen 23 displays the underlying groupings of the selection as illustrated in FIG. 5c. FIG. 5c also illustrates the use of the single mouse clicking to expand the Case Law grouping to reveal the types of data A–E contained therein. By double clicking on any of the types of data A–E, a stack window 211, for summarily (one line per entry) displaying all of the items of the selected type of data, and an edit window 213, for fully displaying a selected item and providing full editing capability therefor, are opened as is illustrated in FIG. 5d. In particular, upon selecting the "Headnote" type of data 205 (FIG. 5c), the stack window 211 displays a stacked listing of single sentence summaries of each headnote (HN), such as headnotes 221, 223, 225 and 227 in FIG. 5d, pointed to within the specifically selected categorization entry (i.e., category, subcategory, sub-subcategory, etc.).

Upon double clicking the mouse 31 a given entry in the stack window 211, the edit window 213 opens to display (and editing) of the full text of the headnote (FIG. 5d). Additional headnotes may be added via the command line 33 and the edit window 213. Headnotes might also be modified or deleted via the edit window 213. Headnotes determined to have particular significance might also be marked, annotated, or associated with any other data item or items within the tailored outline. All associations between data items stored in the libraries 63, 91 and 92 are actually associations between pointers to those data items. The tailored outline contains the pointer associations within the hierarchy of the pointer structures.

In downloading the tailored outline (or portions thereof) to the attorney terminals, the attorney has several choices. The attorney may choose to down-load only the pointers and structure of the tailored outline without the actual data items within the libraries 63, 91 and 92. Specific access to the actual data items stored in the libraries 63, 91 or 92 would be managed via the link 23. Alternatively, the attorney may choose to also down-load all of the case evidence library 91, and all of the related case law and supplemental data items from the libraries 63 and 92. Instead of down-loading all data items, however, the attorney might only down-load the data items currently considered relevant, for example, in an upcoming deposition.

In order to delete from the hierarchical structure of the tailored outline 39, the attorney need only single click the mouse 31 to identify the categorization entry to be deleted, and then select a delete command from the command line 33. Deleting the categorization entry also causes all deeper levels in the hierarchical structure to be deleted. In other words, deleting a category results in the deletion of corresponding subcategories, sub-subcategories, sub-sub-subcategories, and so on. In this way, the attorney can quickly and easily close off all branches in the hierarchy of the tailored outline 39.

Instead of deleting an entire branch, however, the attorney might choose to only delete a specific grouping or one type of data contained therein. Following the same process as before, the attorney merely selects a group or a type of data and the delete command from the command line 33.

As previously described, at any time, the attorney may revisit the outline library 43 to add to the tailored outline 39. Manual additions might also be made. To do so, the attorney enters an outline edit mode via the command line 33, and then manually edits the displayed tailored outline as desired. By double clicking on a newly added categorization entry, a display such as is shown in FIG. 5c appears which provides access to the edit window 213 illustrated in FIG. 5d for adding specific data items under the types of data provided.

To aid the attorney in identifying whether a sub-level in the hierarchy exists for a given categorization entry, italics are used to illustrate a dead-end. For example, referring back to FIG. 5b, if the "Laches" entry labelled "C" had no further sub-levels of categorization thereunder, the entry would appear as "Laches", i.e., in italics. Similarly, to indicate that a categorization entry has no groupings of data thereunder, an underline is provided. Italics are also used to indicate that a grouping of data (FIG. 5c) has no data items thereunder, i.e., the pointer structures contain no entries. Both the italics and underline aid the attorney in parsing through, modifying or otherwise constructing the tailored outline 39.

Instead of using the interactive process, the attorney might request a printout of the entire outline or portion thereof, and redline the printout to eliminate or add to the tailored outline. The redlined version can be given to a paralegal or secretary who makes the modifications in the manner discussed above. Once the tailored outline has been completed, the entire contents of the tailored outline 39 can also be printed out in outline form for record keeping or to provide for manual access.

Figure 5E:
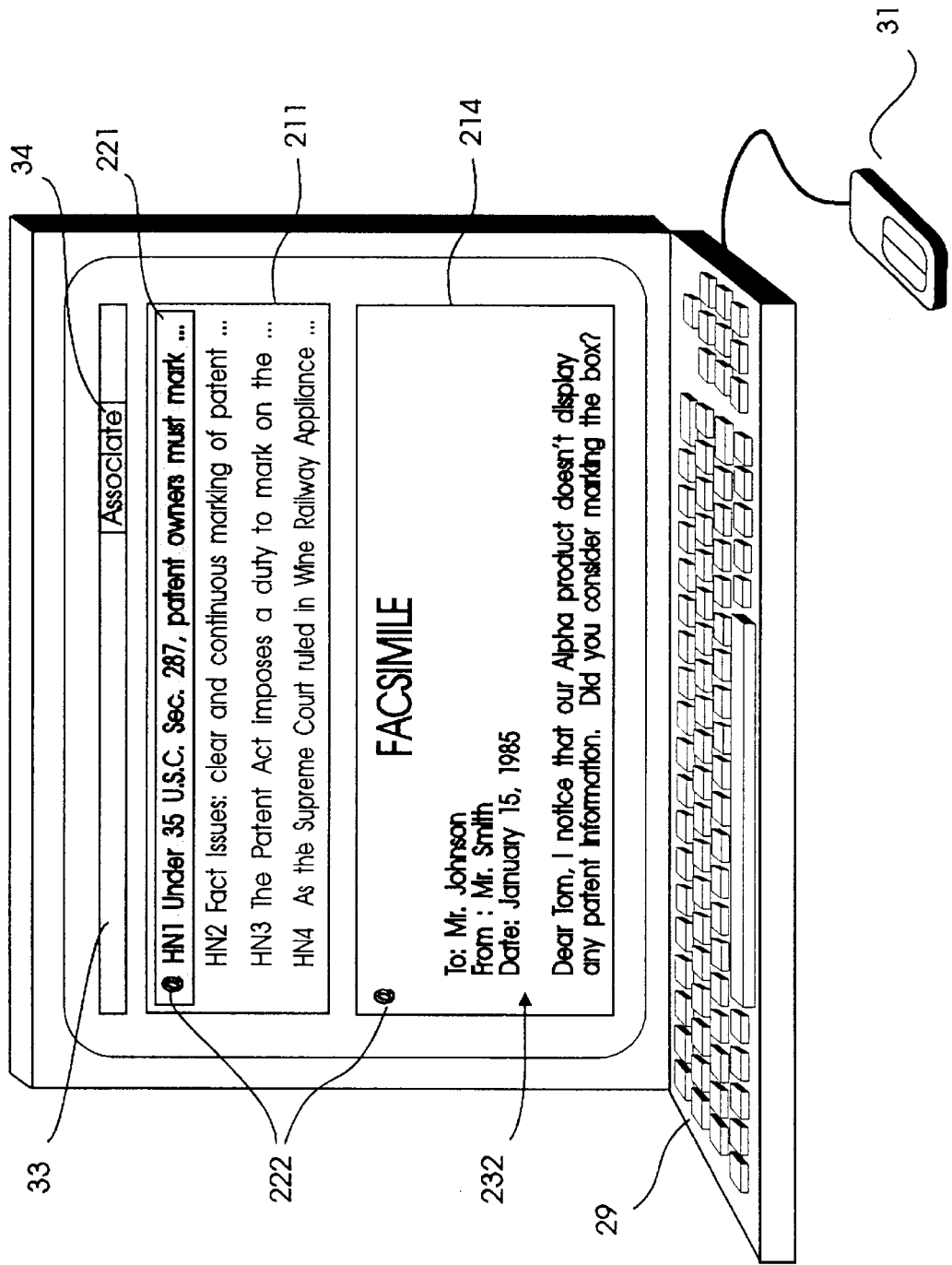
Figure 5F:
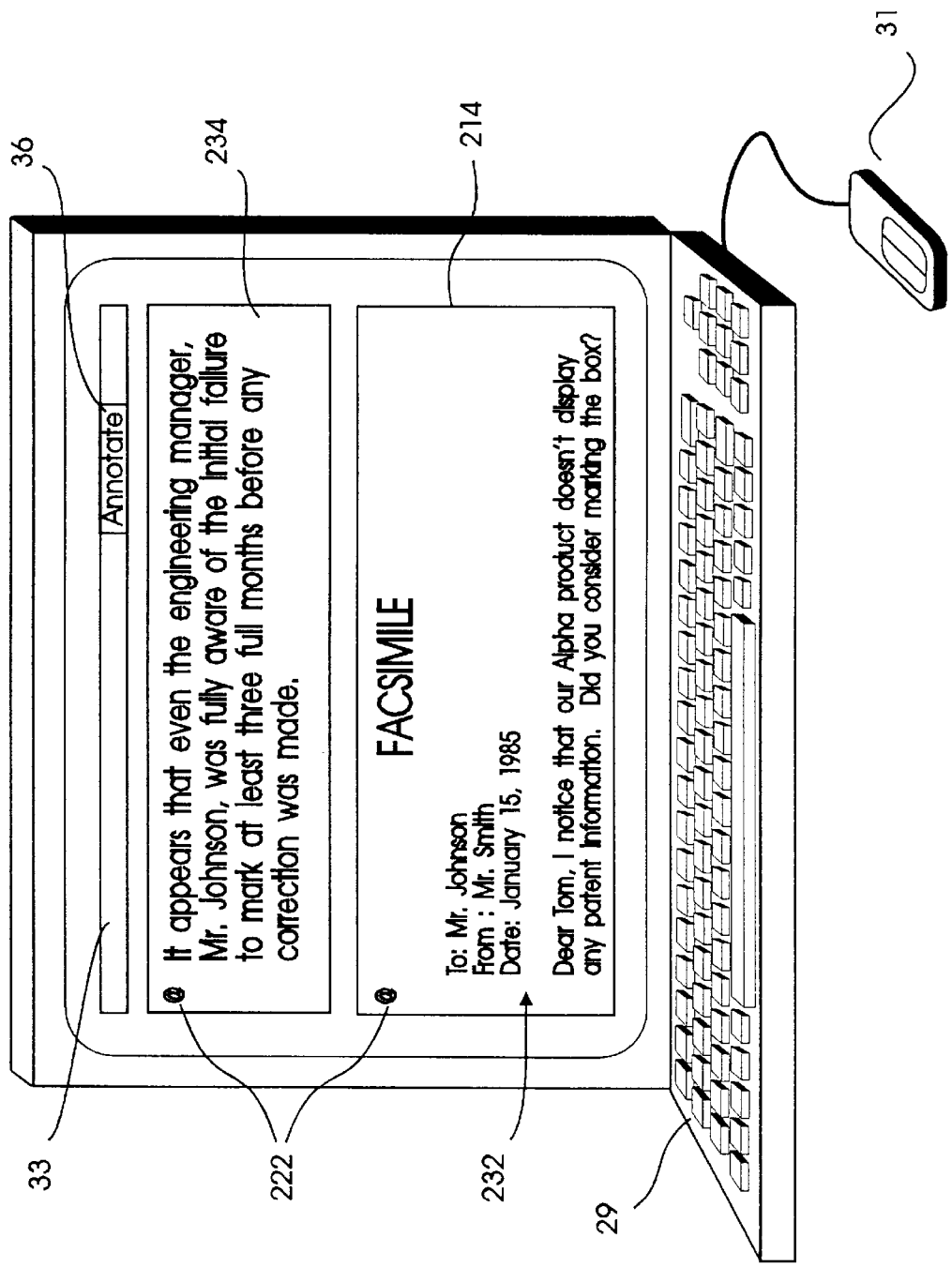

FIGS. 5e and 5f more clearly illustrate the association and annotation process. FIG. 5e provides a perspective view of an exemplary situation under which an attorney might desire to associate data items within the hierarchical structure of the tailored outline. Specifically, for example, during the review of scanned documents via the window 214, the attorney identifies a document 232 which tips off the attorney that the legal issue of marking might be involved. The attorney directs the attorney terminal 21 to display the marking headnotes, such as the headnote 221, in the window 211. This direction may occur through the Roman numeric outline as described above, or via a more graphical display mode illustrated and described in detail below.

After reviewing the headnotes, the attorney decides to generally associate the document 232 into the evidence grouping of the marking categorization entry, and to specifically associate the document 232 with the headnote 221. To accomplish this, the attorney merely selects an associate command 34 from the command line 33. Upon selecting the associate command 34, the association is indicated visually with an "@" character 222 placed in front of both the document 232 and the headnote 221. A pointer to the document is stored into the tailored outline (i.e., into the document and things pointer structure 165), and an association is made (as described in relation to FIG. 4c) with both the document 232 and the headnote 221.

After associating two data items, if only one of the data items is currently being displayed, the other can easily be accessed and displayed. For example, when the attorney terminal 21 displays only the headnote 221, the attorney need only select a display association command (not shown) from the command line 33 to cause the associated document, in this situation the document 232, to be located and displayed. To view multiple associations, the window 211 displays a stack of all associated data items pointed to by a particular association stack, such as the association stack 189 (FIG. 4c). Through the window 211, the attorney may pick and choose those associated data items for full display by double clicking the mouse 31 on a selection.

FIG. 5f provides a perspective view of an exemplary situation under which an attorney might desire to annotate data items within the hierarchical structure of the tailored outline. As in the previous example, while reviewing scanned documents, the attorney encounters the document 232, and decides that a textual annotation is needed. The attorney adds the textual annotation via the window 234 by selecting an annotate command 36 from the command line 33. The window 234 appears and allows the attorney to type, store and directly associate the illustrated annotation. An annotation is merely a note that is directly associated with a data item. Therefore, once created, all annotations are treated as any other data item having an association. In addition to textual data items, audio and video data items are also supported.

Although the Roman numeric display provided by the attorney terminals provides relatively simple access to all items of all of the types of data contained within the tailored outline 39, in many situations, a more selective graphical approach is preferred. FIGS. 6a, 6b, 7a and 7b illustrate the basic functionality of the graphical display of the tailored outline 39, which proves useful in situations where repeated access to specific groupings of data is common. FIG. 8 illustrates the use of selective marking of the outline library 43 of categorization entries and data contained therein. Selective marking provides for corresponding selective display of the outline library 43. Combining the graphical display with selective marking provides the attorney with easier access to only the pertinent information within the tailored outline 43.

Figure 6A:
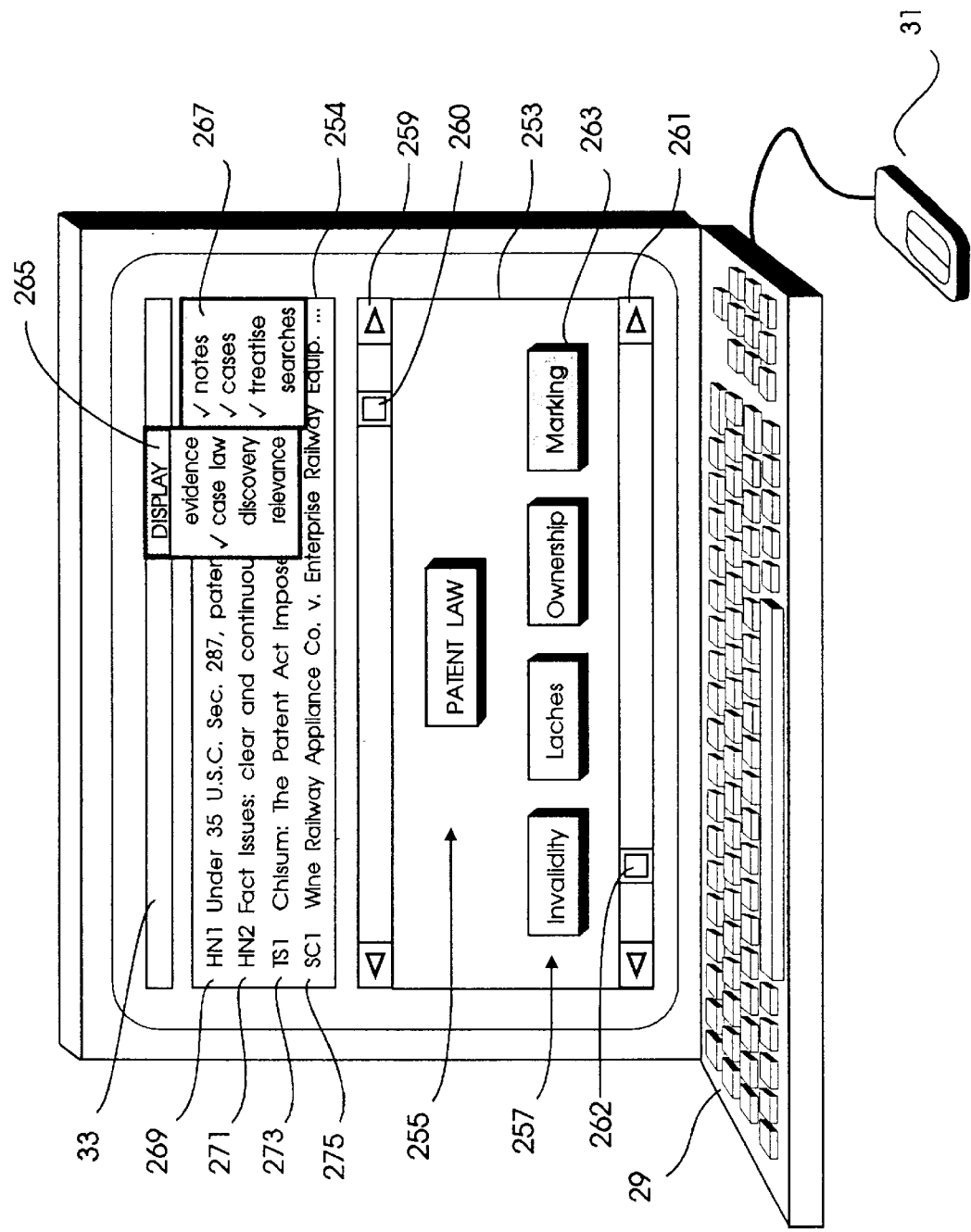
FIG. 6a is a detailed perspective view of an attorney terminal which graphically displays specific groupings of case law information under certain subcategories of the outline library.

Specifically, FIG. 6a is a detailed perspective view of an attorney terminal which graphically displays specific groupings of case law information under certain subcategories of the outline library. In a graphical display mode, the attorney terminal screen is sectioned into three areas: 1) the command line 33; 2) a graphical display window 253; and 3) a stack window 254. The graphical display window 253 provides two levels of hierarchical display of categorization entries. For example, on an upper level 255, the category "Patent Law" is displayed. Below the Patent Law category, on a lower level 257, the subcategories "Invalidity", "Laches", "Ownership" and "Marking" are displayed.

To select other categorizations on the same level not currently displayed, slide bars 259 and 261 are provided. For example, to change to the Antitrust category (not shown), the attorney uses the slide bar 259 to step or scan through all of the categories available in the tailored outline 39 to identify the Antitrust category entry. As the slide bar 259 is moved, the block at the level 255 displays the name of each newly selected category. The categories are arranged in alphabetical order, aiding the attorney in locating the desired category. In addition, via double clicking on a slide bar button 260, a direct textual search for the desired categorization entry might also be made.

Similarly, the attorney moves the slide bar 261 to step or parse through an alphabetical listing of available subcategories at the lower level 257 (although an alphabetized subcategory display is not shown to aid in the labelling process of a Marking subcategory 263). A slide bar button 262 also provides direct textual categorization searching, via a double clicking of the left button of the mouse 31.

To move up and down through the hierarchical structure, the attorney merely selects and drags a block from one of the levels 255 or 257 to the other. The graphical display window 253 responds by stepping up or down through the hierarchy as directed. For example, if the attorney selects and drags the Invalidity subcategory to the upper level 255, the graphical window 253 would only display: 1) the Invalidity subcategory in place of the Patent Law category at the upper level 255; and 2) at the lower level 257, the sub-subcategories of "Best Mode", "Enablement", etc.

To display the groupings, types of data, or specific items contained by any categorization entry, as with the Roman numeric display, the attorney merely double clicks the mouse 31 on the desired block at either of the levels 255 or 257. Doing so causes that block to be displayed at the upper level 255, while the lower level 257 displays the groupings of data. Double clicking on a specific grouping causes that grouping to move to the upper level 255 while displaying the types of data at the lower level 257. Thereafter, double clicking on a specific type of data causes the stack window 254 to display the data items listed (i.e., pointed to) thereunder.

Alternately, to display groupings and items thereunder, a default configuration can be pre-selected via a display command 265 of the command line 33. Upon selecting the display command 265, a pull-down menu appears which provides for the pre-selection of the various groupings for display. Checking a grouping causes a side pull-down menu 267 to appear for pre-selection of the specific type of data to be displayed. Multiple groupings may be checked (pre-selected), and multiple types of data may also be checked from each checked grouping. Once pre-selection has been completed, upon clicking the right button of the mouse 31 to identify a particular categorization entry, the items of all of the pre-selected types of data from each pre-selected grouping of the categorization entry are displayed in the stack window 254.

For example, if an attorney preselects only the case law grouping and headnotes ("notes"), seminal cases ("cases"), treatise selections ("treatise") and preset searches and search context ("searches"), and then selects the marking subcategory 263 with the right button of the mouse 31, the stack window 254 displays headnotes 269 and 271, a treatise selection 273, and a seminal case 275.

Figure 6B:
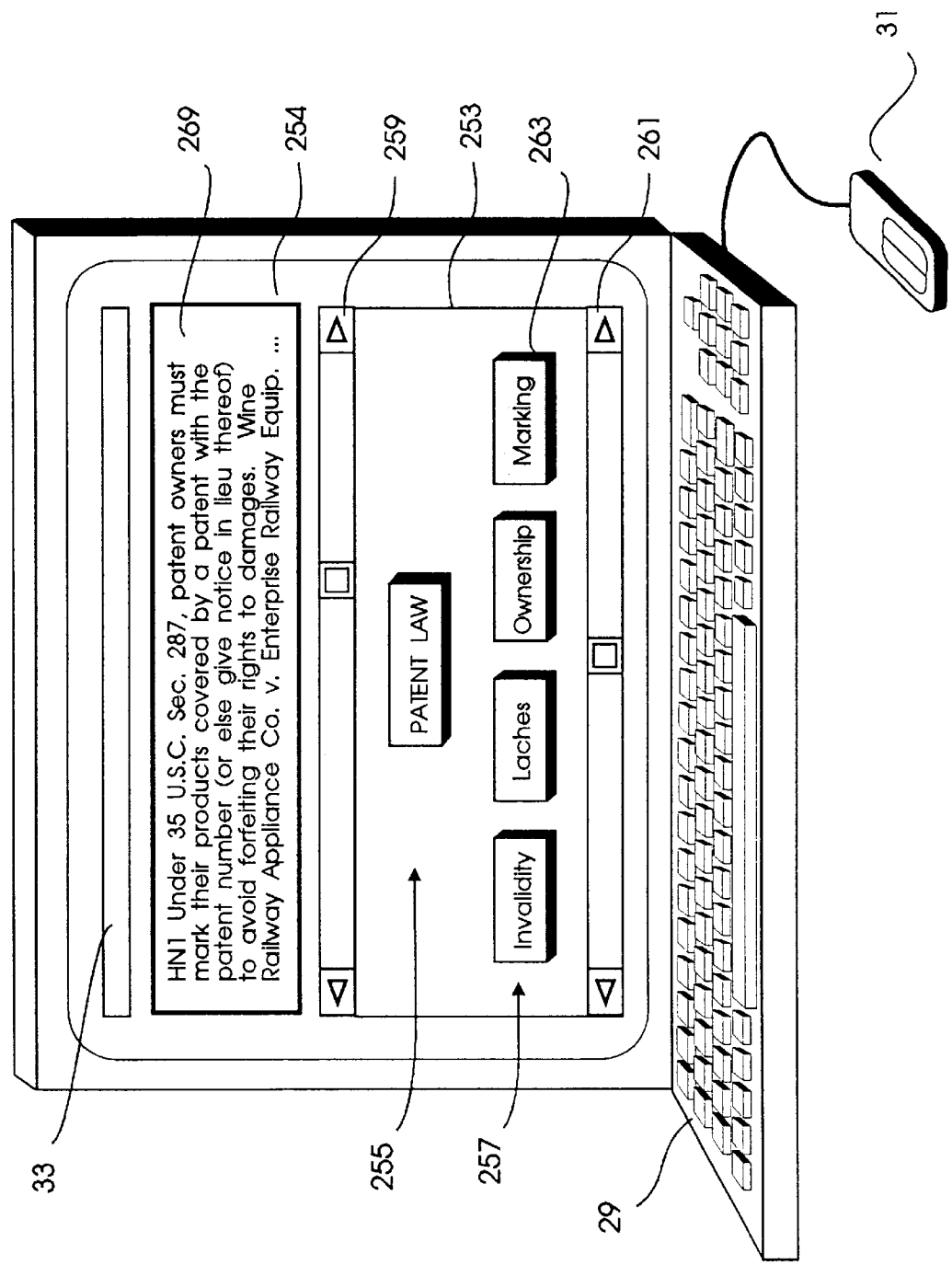
FIG. 6b is a detailed perspective view of the attorney terminal of FIG. 6a which illustrates the use of an edit window to fully display, modify, or create case law grouping information such as a headnote which is directly associated with a subcategory of the outline library.

Any of the entries in the stack window 254 can be selected, via a double click of the mouse 31, for full display in the edit window illustrated in FIG. 6b. As shown, the edit window 269 overlaps the stack window 254, but might instead overlap the graphical window 253 or both, depending on the circumstances, to provide for the display of other information. Similarly, after a categorization selection has been made, the attorney will generally close or hide the graphical display window 253 to provide room for the display of other information.

The categorization entries available for display within the graphical display window 253 can be limited to only those entries marked as pertinent, as detailed below in reference to FIG. 8. Similarly, those groupings, types of data, and corresponding items which have been marked as pertinent can also be selectively displayed.

The pre-selection settings and the selective pertinence marking not only provides for selective display of the tailored outline 39, but can also be used individually or in combination for limiting searching. In particular, upon selecting a search command from the command line 33, a default configuration may be made or modified which limits searching within the tailored outline 39 to areas which have been pre-selected. Similarly, a separate default configuration may also limit searching to those categorization entries, groupings, types of data, and items which have been marked as pertinent.

Figure 7A:
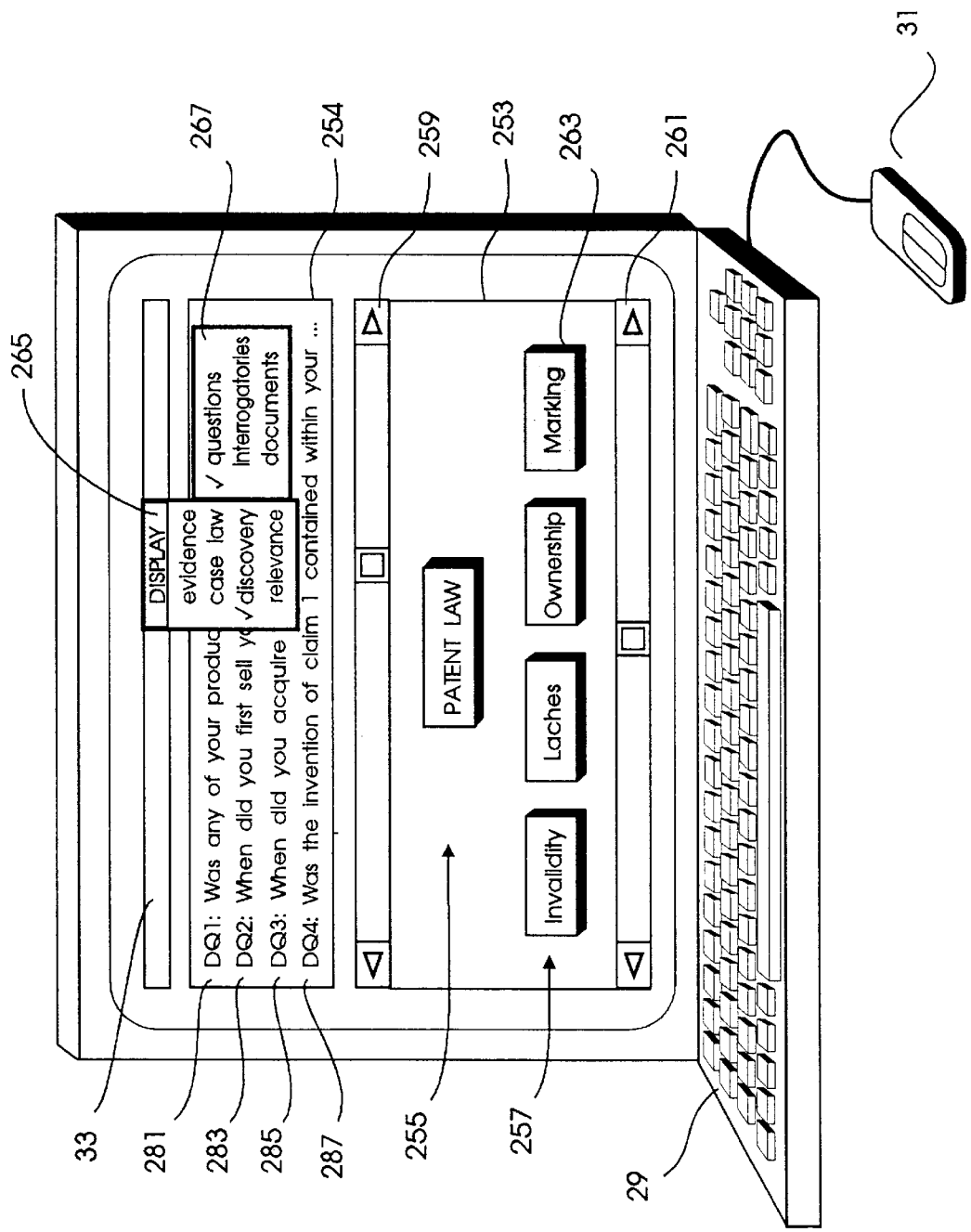
FIGS. 7a–7c are detailed perspective views of an attorney terminal operating in the outline mode which graphically displays groupings of draft questions under a marking subcategory in the outline library, wherein the draft questions are selected, modified or added for use in a deposition or trial proceeding.

FIG. 7a is a detailed perspective view of an attorney terminal which graphically displays groupings of draft questions in the stack window 254 from the marking subcategory 263, for use in a deposition or trial proceeding. In preparing for a deposition or trial, although the Roman numeric display might be used, the attorney uses the graphical display window 253, stack window 254, and edit window 282 (FIG. 7b) to gather questions for use during an upcoming deposition.

The attorney first uses the graphical window 253 to locate the desired areas to be used based on the characteristics of the witness. An expert witness, for example, might be able to testify regarding the technical details of specific law or fact, while an eye witness might only offer a present sense impression regarding other factual issues relating to possibly other areas of law. FIG. 8, described below, further illustrates the process of limiting the categorization entries for a specific witness.

Once a categorization entry has been selected such as, for example, the marking subcategory 263, the attorney clicks the right button of the mouse 31, to display the default settings of the display command 265. In response, the stack window 254 displays the draft questions 281, 283, 285 and 287 associated with the subcategory marking 263 for potential use during the deposition or trial proceeding. As with all stack window 254 displays, additional entries in the stack (i.e., additional draft questions) can be accessed by a scrolling process.

Figure 7B:
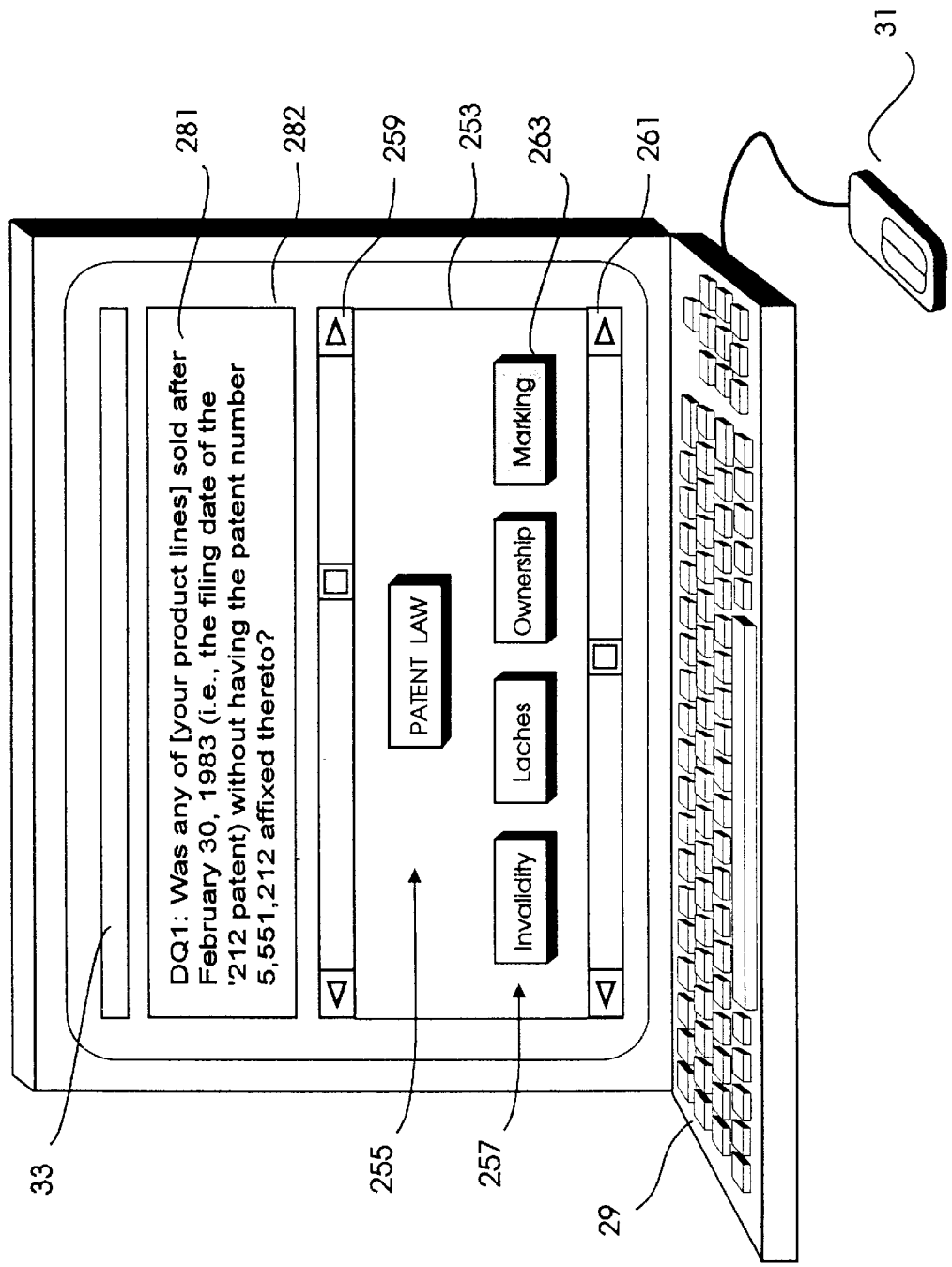
Figure 8:
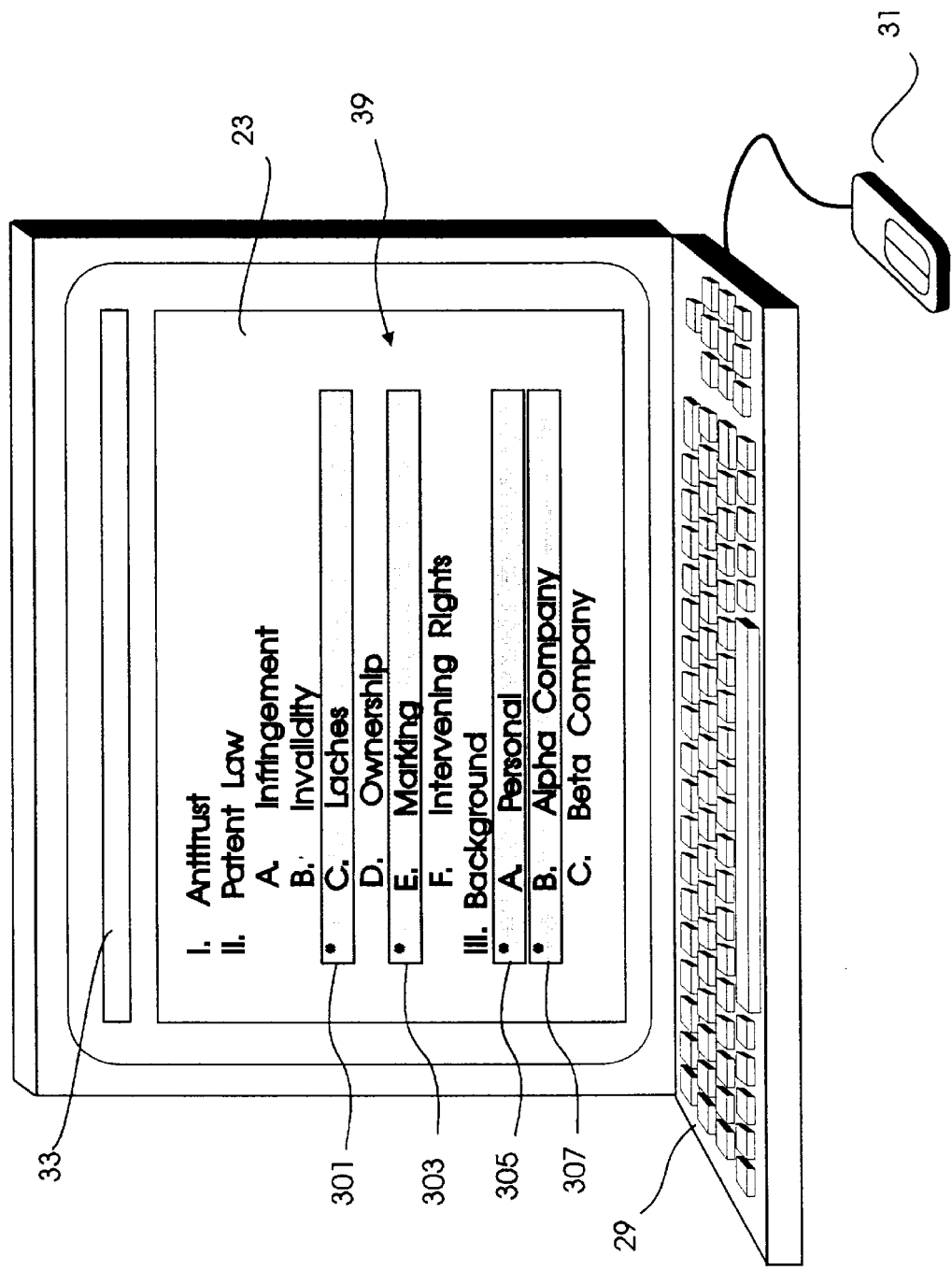
FIG. 8 is a perspective view illustrating the selection of categories, subcategories, etc., to be used during an upcoming deposition or trial, wherein, in view of the witness's anticipated knowledge, only those areas of the tailored outline considered pertinent are selected for later access during the proceeding.

By double clicking on a specific draft question such as the draft question 281, referring to FIG. 7b, an edit window appears for displaying the full text of the draft question. In this form, the attorney may modify the question if so desired via a variety of typical editing commands available through the command line 33. The command line 33 also provides for opening a clear edit window so that the attorney may draft a question from scratch. In addition, specific documents, case law, etc., may be directly associated with draft questions for reference during the deposition. Thus, the attorney utilizes the attorney terminal 21 in the outline mode to prepare for an upcoming deposition or trial proceeding.

Figure 7C:
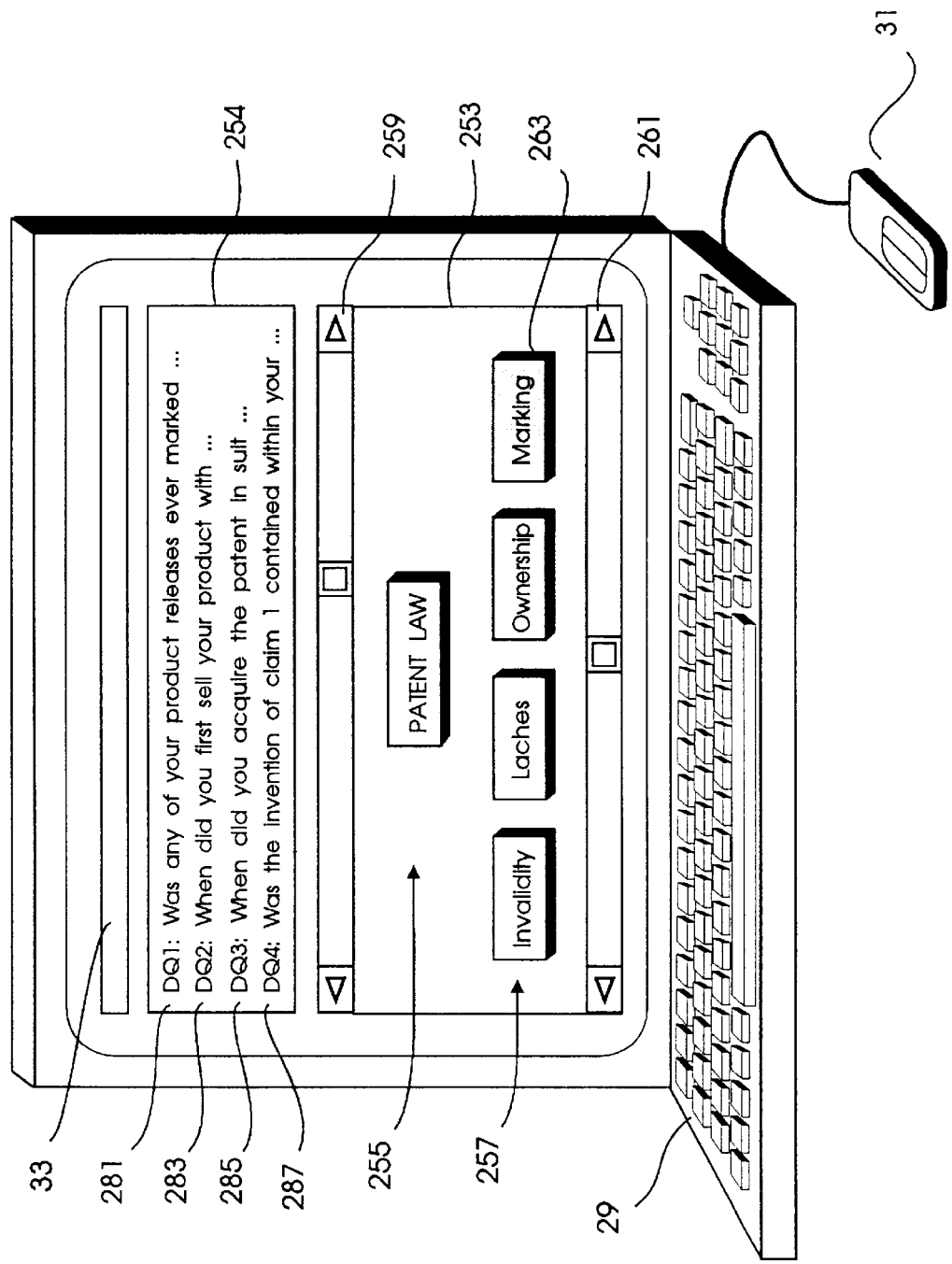

Referring to FIG. 7c, during the deposition or trial proceeding, the attorney terminals are used in the deposition mode to recall the draft questions to aid the questioning process. To begin, the examining attorney merely selects a categorization entry for conducting questioning as previously described by locating and double clicking the mouse 31. For example, double clicking on the marking entry 263 causes the stack of draft questions to appear in the window 254. Thereafter, the attorney may use the draft questions and associations thereto in the questioning process.

Upon completing all of the questioning under a given categorization entry, the attorney merely locates and selects via the window 253 another categorization entry to display other draft questions related thereto. This process continues until all questioning regarding all categorization entries has been exhausted.

In addition to providing access to the corresponding draft questions, associations, case law and case evidence, the process of moving through the tailored outline while in the deposition mode also serves to automatically categorize all actual questions and answers asked during the proceeding. For example, all Q&A's transcribed while under the marking categorization entry 263 are automatically added to the Q&A pointer structure 163 (FIGS. 4b and 4c).

The second chair attorney using the terminal 21 can also control the display of the terminal 19 used by the first chair attorney. For example, the second chair (associate) examining attorney can step through the hierarchical structure of the tailored outline instead of the first chair examining attorney while in the deposition mode. As categorization entries are selected, the draft Q&A's can be displayed on both attorney terminals 19 and 21 under the control of the second chair attorney. Moreover, without controlling the first chair attorney's display, the second chair attorney can also transmit specific draft Q&A's as messages to the first chair examining attorney during the proceeding.

The examining attorney may also choose to only use the tailored outline for specific areas of the tailored outline, or for unanticipated areas of law that are uncovered and retrieved during the proceeding. As a result, in such circumstances, automatic categorization is not used. After the proceeding, the attorneys (or their paralegals) may then manually categorize all of the Q&A's or only those Q&A's considered significant.

Figure 7D:
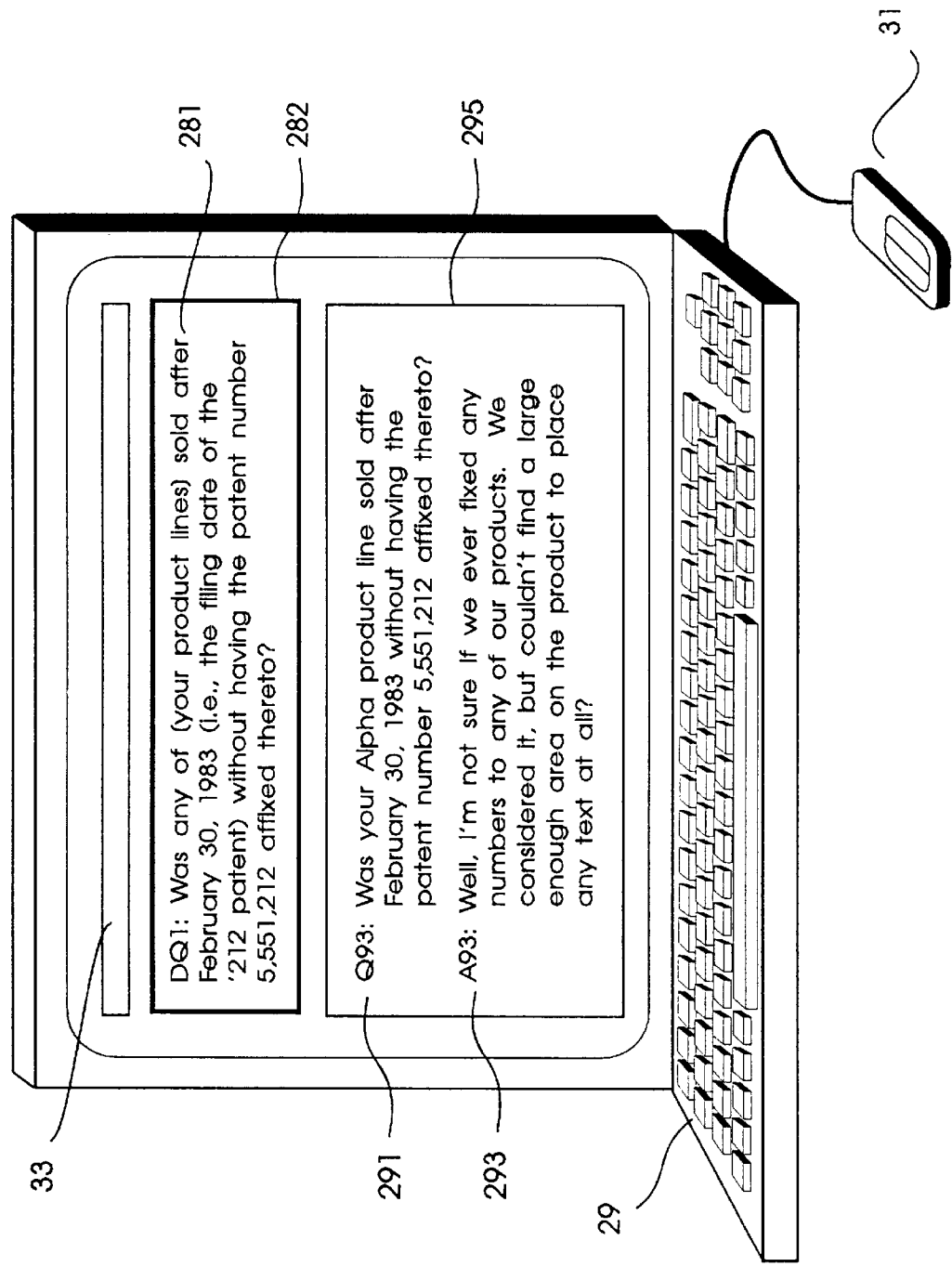
FIG. 7d is a detailed perspective view of an attorney terminal operating in the deposition mode which illustrates the use of a draft question as the basis for an actual question asked during a deposition or trial proceeding.

FIG. 7d is a perspective diagram of the attorney terminal 19 operating in the deposition mode on a draft question retrieved from the tailored outline as illustrated in FIG. 7a. By double clicking on a retrieved draft question, the question 281, the edit window 282 enters an edit mode to display the full text of the question 281 as shown. In a transcription window 295, the terminal 19 displays a question 291 and a corresponding answer 293 which constitute real-time transcription received from the CAT system 11 (FIG. 2). As can be appreciated from the illustration, the examining attorney may use draft questions, such as the question 281, to directly formulate actual questions, such as the question 291, during the proceeding.

An attorney switches from the real-time transcription display (FIG. 7d) to the tailored outline display (FIG. 7a) as necessary to seek out and use draft questions during a deposition. The command line 33 provides for such switching between displays.

In addition, within the draft question, parenthesis are used to provide instructions to help the attorney understand a draft question. Brackets are used to indicate that further tailoring (modification) of the bracketed words might be in order. In addition, specific instructions or "tips" may be provided to instruct the user as to the formulation of a line of questioning.

Although not shown, the graphical display window also uses italics and underlining convention established with the Roman numeric display. Italics are used to indicate categorization dead-ends, while underlining indicates that underlying grouping items do not exist. In addition, when providing only a selective display of the information marked as pertinent, the italics and underlying convention applies only to the marked information in the tailored outline 39. For example, if items exist but none are marked as pertinent under a given subcategory, the subcategory will be displayed with an underline.

FIG. 8 is a perspective view illustrating the selection of categories, subcategories, etc., to be used during an upcoming deposition or trial, wherein, in view of the witness's anticipated knowledge, only those areas of the tailored outline considered pertinent are selected for later access during the proceeding. To select a section of the tailored outline 39 for inclusion in the deposition or trial proceeding, the attorney selects a pertinence mode from the command line 33, and scrolls through categorization entries to mark the desired entries via a single clicking of the mouse 31. Single clicking also causes the sub-categorization levels to appear if they exist for a more specific selection. Moreover, single clicking the categorization entry a second time causes the sub-categorization levels to disappear from the display, and causes the categorization entry to be unmarked as not being pertinent if no sub-categorization entry thereunder has been marked.

Double clicking of the mouse 31 acts to provide access to the underlying groupings as described in relation to FIG. 5c above. These too may be marked as pertinent, as can the underlying types of data and actual data items. However, if the groupings, types of data, and data items listed contain no pertinence marking, all will be considered marked as pertinent if the corresponding categorization entry is marked.

For example, the attorney may believe that because the deponent was not working at the plaintiff's company until a date after the assignment document was executed, the deponent will probably have no knowledge of an assignment. The attorney may then choose not to select "ownership" for selective display in the tailored outline for this particular witness. It also may be that the attorney has elected not to challenge ownership and therefore the ownership area is not included.

After selection, a bar background of a contrast color is placed around the selected categorization entry such as entries 301, 303, 305 and 307. If the attorney changes his mind, a selection may be un-selected by placing the cursor over the selection and again single clicking the mouse 31.

In an identical process, all of the information contained within any selected category, subcategory, etc., can be further screened to simplify the use of the tailored outline for a given witness during the deposition or trial proceeding. For example, specific draft questions can be selected, while the other discovery groupings might be ignored.

Thus, only those categorization entries and underlying data items anticipated to be relevant for a given witness are marked as pertinent for selective display and possibly selective searching during the deposition or trial proceeding. The pertinence marking is saved in a configuration file under the witnesses last name for later loading during the deposition.

The pertinence marking process is also automatically applied while in the Pretrial Mode to enumerate the documents and things, and the deposition designations to be used at trial. In particular, concurrent with the generation of the draft Exhibit and deposition designations lists, a pretrial configuration is generated which provides for selective display and searching of only those items selected in the Pretrial Mode. The pretrial configuration may be directly used at trial or might be loaded as a starting point in the continued narrowing of the tailored outline 39 for trial. Similarly, an attorney might desire to have specific pertinence selections stored for personal use outside of the trial or deposition context.

After the attorney has generated a witness specific pertinence marking configuration, the attorney can begin (or continue) to review and associate the pertinent evidence and pertinent case law with the pertinent draft questions. Questions might also have been selected as pertinent from previous depositions for reuse. Conflicting answers to reused questions can then immediately be pointed out by the attorney on the transcript record, forcing the witness to change his testimony or say that the previous witness was wrong. In either case, the veracity of one of the witnesses becomes a beneficial issue.

Typically, the attorney will have a paralegal prepare a witness kit which is merely a file and index of a copy of all documents which were authored by or addressed to the deponent. The attorney will review the documents in the witness kit for potential deposition exhibits as well as for formulating potential questions to add to the outline 39. If such documents have been scanned into the tailored outline 39, the witness kit review may take place fully on the attorney terminal. Therein, the attorney's notes or annotations can be directly made and reviewed to the scanned image. Associating a scanned document image to a specific question or questions may provide the attorney with direct reference to the basis for the inquiry, for example. Similarly, documents, annotations, questions, case law, etc., might be associated with a communication from another terminal: 1) as illustrated in FIG. 2, to help guide the first chair attorney using the terminal 19 in conducting the questioning; or 2) as illustrated in FIG. 1, to help clarify the requests for information or receipts thereof.

Furthermore, if during the attorney's review of the documentary evidence, he wishes to review case law to understand the import of a certain document, the attorney may use the tailored outline 39 to retrieve the law.

Figure 9:
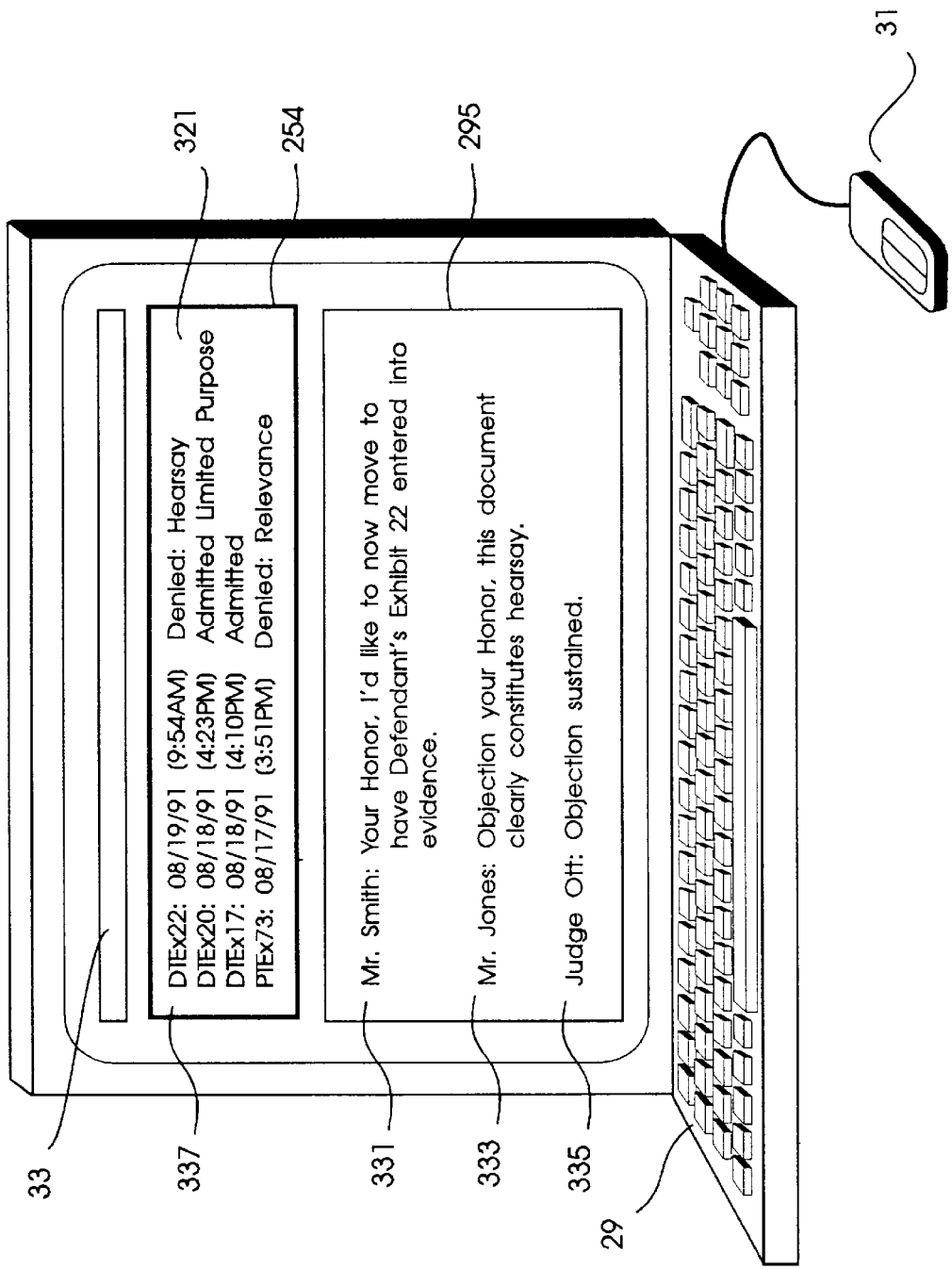
FIG. 9 is perspective view providing further detail of the system configuration of attorney terminals operating in the evidence mode according to the present invention.

FIG. 9 is a perspective view providing further detail of the system configuration of attorney terminals operating in the Evidence Mode according to the present invention. In a trial or deposition proceeding, attorney terminals automatically track the status of the entry of Exhibits into the record.

Specifically, during a proceeding while in the Evidence Mode, the attorney terminal displays Exhibit entry information 321 in the stack window 254 while displaying the ongoing transcribed text of the proceeding in the transcription window 295. Each entry in the stack window 254 includes an indication of the exhibit number, date, time, and description of the results of the attempted entry.

When an attorney uses the term "Exhibit" during a deposition or at trial, the use of the word triggers an analysis of the status of that Exhibit number's use in the lawsuit, for example, as occurs in response to a transcribed statement 331 from a moving attorney. If the use of an Exhibit is detected, the attorney terminal compares the Exhibit number to a list of Exhibits already entered into the record. This list is contained in the chronologically ordered listing displayed in the stack window 321. If the Exhibit number already exists, the attorney terminal 21 considers the use acceptable and continues the monitoring process. If, however, as illustrated, the Exhibit number does not exist, the attorney terminal 21 further analyzes the context of the usage to determine whether a proper attempt has been made to enter the Exhibit into the record, and, if so, whether objections were stated, and whether the attempt was successful.

To determine whether a proper attempt to enter the Exhibit has occurred, the attorney terminal analyzes the unit of speech containing the usage of the new Exhibit number, i.e., most likely the current question being asked, to determine whether the attorney is attempting to enter the Exhibit into the record. In FIG. 9, the unit of speech is the transcribed statement 331. Specifically, the determination is made based on the existence of key terms such as "mark" for a deposition proceeding and "move" for trial. If the use of the term "Exhibit" is determined to be for an attempted entry into the record, the terminal 21 updates the Exhibit list and displays a message to the attorney indicating that a new Exhibit has been added, for example, as illustrated by a new entry 337. If the determination is incorrect, the message acts as a warning to the attorney that an improper attempted entry of the Exhibit has been made. Similarly, if the determination is made that the new Exhibit has been improperly used, i.e., without proper entry, the attorney terminal 21 displays a warning message to that effect.

Upon determining that a proper attempt to enter an Exhibit has been made, the terminal 21 automatically evaluates the subsequent units of speech, i.e., transcribed speech units 333 and 335, to identify any related objections, and, if so and at trial, to identify the judge's ruling. Upon identifying any objections raised, the attorney terminal 21 adds the objections to the new entry, entry 337, in the Exhibit list. If the judge makes a ruling, as is illustrated by the unit 335, that ruling is associated with the Exhibit list. The Exhibit list contained within the stack window 254 also automatically, directly associates the corresponding exchanges between the parties and the judge, i.e., the units 331, 333 and 335, for later review. Upon double clicking on any of the exhibit list entries, as with any stack window 254 entry, an edit window (not shown) is used to provide for modifying the entry if necessary. In addition, upon clicking the right button of the mouse 31, the transcription window 295 automatically displays the associated corresponding exchanges.

In addition, it is also contemplated that the tailored outline 39 may directly store all lawsuit information including case evidence, case law and work product. However, as FIGS. 4b and 4c illustrate, the tailored outline 39 merely points to the separate lawsuit information. The tailored outline 39 and lawsuit information can be stored locally (within the attorney terminals), remotely (at possibly a dial-up location), or distributed between the two. Storage remotely carries the advantage of creating a common access point for use by all of the attorneys on the lawsuit. A remote, common access point provides for easier back-up and maintenance than that required in a distributed system. One drawback, however, is that the access may sometimes be slow or unavailable because of faulty or non-existent communication links. To accommodate such situations, the attorney terminals may use the pertinence selection process to extract for local storage portions of the remotely stored tailored outline 39 before going to a deposition. Upon returning, the newly added information in the extracted local portion of the tailored outline 39 is automatically extracted into the remote tailored outline 39 to bring it up-to-date.

In addition, as generally illustrated by FIGS. 7a–c, any data items contained within the tailored outline can be used inside or outside of a legal proceeding. For example, by selecting a preset search request with the corresponding search context from the pointer structures 127 and 129, in a similar process as described in FIGS. 7a–c, a search request may be executed immediately or after minor modification to perform either a boolean or natural language search on the case law library 63. Similarly, draft jury instructions might be accessed, displayed, modified, and printed for preparing a Pretrial Order.

During a proceeding, should a particular categorization entry not be contained in the selected tailored outline 39, the attorney may use an attorney terminal to access the outline library 43 to retrieve generic Q's, law, etc., during a deposition. For example, if during the deposition the examining attorney asks:

Q78. Now what makes you think that my client copied your invention?

A78. Your client stole my product out of my engineering department.

The examining attorney immediately searches his brain for the law of slander and libel. What does he need to prove? He may or may not know. The questioning continues:

Q79. Did you tell anyone about this?

A79. Yes, I told my sales force.

Q80. Did you tell your independent sales reps about this?

A80. Yes.

The examining attorney decides that he desires more testimony on this issue in the next 5 minutes before the witness' counsel, the defending attorney, walks the witness outside for counseling regarding the law.

While the first chair struggles for questions, the second chair attorney may use the terminal 21 to quickly access the categorization entries in the outline library 43 regarding the law of slander and libel. Instant access is provided to case law information, i.e., the types of data contained under the case law grouping and to associated draft questions which may have been at least partially tailored to the lawsuit at issue. Thereafter, the second chair attorney may send the draft questions and case law information in whole or in part to the first chair examining attorney along the link 23 (FIG. 2). In addition, although not as desirable, the first chair attorney may manage direct access to the outline library 43 himself without assistance from the second chair attorney.

Although the second chair attorney is illustrated as being physically located at the legal proceeding in FIG. 2, the second chair attorney might also be remotely located. Similarly, any of the other attorneys, paralegals, experts, or clients might also step in to assist the attorney(s) during the deposition, these individuals being either locally or remotely located.

Moreover, it is obvious that the embodiments of the present invention described hereinabove are merely illustrative and that other modifications and adaptations may be made without departing from the scope of the appended claims.

We claim:

1. A transcription system used to convert words spoken during a transcription proceeding to a textual form for real time display and categorization, the transcription system comprising:

a transcriber that produces, in real time, transcript text representative of spoken words;

a user input device supporting the creation of a list of issue categories that relate to the transcription proceeding;

a screen that displays during the transcription proceeding the list of issue categories and the transcript text; and a processor that responds to the user input device as the transcriber produces the transcript text by classifying at least a portion of the transcript text as belonging to at least one of the list of issue categories.

2. The transcription system of claim 1, wherein the screen also supports display of previously categorized transcript text based on a selection of a category via the user interface from the list of issue categories.

3. The transcription system of claim 1 further comprising:

a communication network that receives communications; and the processor classifying each communication received via the communication network as belonging to at least one of the list of issue categories.

4. The transcription system of claim 1 wherein the processor directs the display of previously classified draft questions based on selection of at least one of the categories from the list of issue categories.

5. The transcription system of claim 1 wherein the user input device supports real time selection of the at least one of the list of issue categories.

6. The transcription system of claim 5 wherein the user input device supports real time modification of the selection of the at least one of the list of issue categories for further classification by the processor.

7. The transcription system of claim 1 further comprising a terminal, and wherein the terminal comprises the processor.

8. A transcription system used to convert words spoken during a transcription proceeding to a textual form for real time display and categorization, the transcription system comprising:

a transcriber that produces, in real time, transcript text representative of spoken words;

a communication link;

a screen that displays during the transcription proceeding a list of categories;

a processor that receives the transcript text in real time from the transcriber via the communication link for display on the screen; and the processor, as the transcriber produces the transcript text, classifying at least a portion of the transcript text as belonging to at least one of the list of categories.

9. The transcription system of claim 8 wherein the screen displays previously categorized transcript text based on a selection of a category from the list of categories.

10. The transcription system of claim 8 further comprising:

a communication network that receives communications; and the processor classifying each communication received via the communication network as belonging to at least one of the list of categories.

11. The transcription system of claim 8 wherein the processor directs the display of previously classified draft questions based on selection of at least one of the categories from the list of categories.

12. The transcription system of claim 8 further comprising a user input that supports real time selection of the at least one of the list of categories.

13. The transcription system of claim 12 wherein the user input supports real time modification of the selection of the at least one of the list of categories for further classification by the processor.

14. The transcription system of claim 8 further comprising a terminal, and wherein the terminal comprises the processor.

15. A method used during a transcription proceeding for categorizing transcript text, the method utilizing at least a stenographic system, a screen, and a user input device, the method comprising:

converting, using the stenographic system, representations of spoken words to transcript text in real time;

displaying the transcript text on the screen for real time review;

displaying on the screen a list of issue categories;

accepting, via the user input device, an input selecting at least one issue category from the list of issue categories; and associating at least a portion of the transcript text with the selected at least one issue category.

16. The method of claim 15 further comprising accepting, via the user input device, an input modifying the list of issue categories.

17. The method of claim 15 further comprising:

accepting, via the user input device, an input selecting an alternate at least one issue category from the list of issue categories; and associating at least a portion of the transcript text with the alternate at least one issue category.

18. The method of claim 17 further comprising:

storing the transcript text;

accepting, via the user input device, an input reselecting the at least one issue category; and displaying the stored transcript text associated with the at least one issue category.

19. The method of claim 15 further comprising:

receiving, via a communication network, communications; and associating each communication received with at least one issue category of the list of issue categories.

20. The method of claim 15 further comprising:

storing the transcript text; and displaying the stored transcript text associated with the at least one issue category.

* * * * *